CLARENCE S. JONES
INVENTOR
BY Richard G. Stephens
ATTORNEY

CLARENCE S. JONES
INVENTOR
BY Richard L. Stephens
ATTORNEY

CLARENCE S. JONES
INVENTOR
BY Richard G. Stephens
ATTORNEY

March 17, 1964 C. S. JONES 3,125,753

SIGNALLING SYSTEM

Filed Feb. 18, 1958 7 Sheets-Sheet 4

CLARENCE S. JONES
INVENTOR

BY Richard D. Stephens
ATTORNEY

March 17, 1964 C. S. JONES 3,125,753

SIGNALLING SYSTEM

Filed Feb. 18, 1958 7 Sheets-Sheet 5

CLARENCE S. JONES

INVENTOR

BY Richard D. Stephens

ATTORNEY

CLARENCE S. JONES
INVENTOR
BY Richard D. Stephens
ATTORNEY

CLARENCE S. JONES
INVENTOR
BY Richard G. Stephens
ATTORNEY

United States Patent Office 3,125,753
Patented Mar. 17, 1964

3,125,753
SIGNALLING SYSTEM

Clarence S. Jones, Los Altos, Calif., assignor to General Precision, Inc., a corporation of Delaware Filed Feb. 18, 1958, Ser. No. 715,899
51 Claims. (Cl. 343—6.5)

This invention relates to electrical signaling systems, and more particularly to apparatus for signalling between one or more movable devices, such as vehicles and one or more remote stations. An especially useful embodiment of the invention comprises a railway signalling system.

In the transportation and materials handling fields in general, and particularly in the railway arts, it often becomes desirable to provide information at a central station regarding the location of, and perhaps other characteristics and conditions of a plurality of movable vehicles such as switch engines, which, in performance of their assigned tasks, may be driven by their operators over a wide area. A considerable savings in time and money may be effected if an operator at a central station may be apprised at all times of the exact or approximate location of each of the switch engines of his system. It heretofore has been suggested that radio links be established between each engine or each train in order that the operators of the trains be able to inform a central station operator of their location, and in order that the central station operator transmit information and instructions to the individual train operators. While such systems have been quite useful, their effectiveness has been limited by the fact that each train operator must be relied upon always to furnish accurate information with regard to his train. The need for an automatic system for transmitting train location data to a central station has been recognized, and while various systems have been proposed, as far as I am aware none has been very successful. The present invention provides improved means for automatically registering location data aboard a moving object, such as a vehicle, for example, in order that a transmitter may be actuated in accordance with such data to transmit the data to a central station or other remote location.

In addition to the above problem, there also exists the problem of automatically identifying and/or classifying numerous movable devices such as vehicles which may pass near or over a given location. For example, as various trains of railroad cars arrive at a switching terminal they commonly are uncoupled and sorted in one manner or another, various cars being directed to various tracks or storage locations. It is often very desirable that the location of each car be known at a central station. When trains of outgoing railroad cars are "made up," it is often necessary that a search be made among a large number of railroad cars in order to locate a single car. Various data processing systems have been devised which are quite suitable for sorting, classifying and remembering data pertaining to any desired number of cars, but the derivation of suitable input data for such data processing systems has amounted to such a task that full use of the available data processing equipment has not been extensive. It has been extremely desirable that improved means be provided to allow a central object or device to identify each of a plurality of objects which pass by, to provide suitable data for known sorting and remembering data processing systems. The present invention provides means which may be adapted to solve either or both of the above described problems. It will be seen at this point that various embodiment of the invention may be grouped arbitrarily into two categories, one being means for passing information as to location of a moving object with respect to a plurality of fixed locations to the movable object, and the other being means for passing information as to the identity of a plurality of movable devices to a given location.

Apparatus for passing information as to vehicle location from a plurality of locations to a vehicle will be described first. Generally speaking, the invention may be said to comprise an interrogator-responder system. A plurality of responder transmitters, which I call "response blocks," may be located at various different locations along a railroad right-of-way, preferably on top of or inside various track ties. The number of response blocks to be used is principally a matter of choice, although it depends in part on the number of "digits" to be accommodated by the system, as will be further explained below. Each response block may consist of a plurality of tuned circuits resonant at different frequencies, and an oscillator powered and controlled by said resonant circuits. The "interrogator" portion of the invention comprises a variable frequency oscillator system, which may comprise either a single or several controllable frequency oscillators, or preferably, a plurality of oscillators each fixed to provide an individual single frequency output. The interrogator unit may be mounted on and carried by the vehicle at which the location data is to be registered.

Power from the interrogator oscillators may be electromagnetically coupled to a power-inducing coil carried on the vehicle preferably near the base of said vehicle. When the vehicle is located near or directly above a response block, or more precisely, when the power-radiating coil carried by the vehicle is located near or directly above a response block, power from the radiating coil is applied to the resonant circuits of the response block. The exemplary interrogator unit to be described herein is provided with ten code oscillators each operating at a single frequency within a frequency range between 16.67 and 96 kilocycles per second, as indicated by the following table:

| Digit | Frequency (kc) | Digit | Frequency (kc) |
|---|---|---|---|
| 1 | 16.67 | 6 | 46 |
| 2 | 20 | 7 | 55 |
| 3 | 25 | 8 | 71 |
| 4 | 31 | 9 | 88 |
| 5 | 37 | 10 | 96 |

It should be noted that the various frequencies have been selected so that none are second or third harmonics of others, which helps prevent erroneous operation from harmonic components of the oscillator signals. The interrogator unit also may be provided with a further oscillator operating at 66 kilocycles per second for automatic gain control, as will be explained in detail as the description proceeds. The above frequencies, of course, are exemplary only, and the frequency range to be used may be governed by the particular application of any specific embodiment. For railway use of the nature presently described, however, it is deemed advantageous to keep with in a frequency range of 10 to 500 kilocycles. Signals of these frequencies may be transmitted easily through several inches of water, while considerably higher frequency signals are more severely attenuated, particularly if the water is made conductive by salts or other wastes along the railroad right-of-way. Furthermore, use of the lower frequencies makes the system less subject to local metal loading. It will be apparent, of course, that either more or less than ten digit frequencies may be used.

A binary coding may be effected by selection of or omission of particular resonant circuits in each response block. For example, if a particular response block location is to be designated by the binary code 1010101010, the response block at that location may be provided with tuned circuits resonant at the first, third, fifth, seventh and ninth digit frequencies, with no tuned circuits provided for the second, fourth, sixth, eighth and tenth digit frequencies, and with such an arrangement the presence and absence of particular tuned circuits will indicate "ones" and "zeros," respectively, in the digital code. An inverse coding may be used with equal facility, with the presence of a tuned circuit representing a binary "zero" and the absence of a tuned circuit representing a binary "one." Furthermore, it is in no way essential that adjacent order binary digits be related to adjacent frequency channels, although straight-forward coding of this nature facilitates testing, maintenance and repair.

One important advantage of the present invention is that the electromagnetic interrogation and response signals are capable of being transmitted and received successfully under various adverse conditions. Certain prior art systems for identifying moving vehicles require precise physical alignment of a movable unit with respect to a fixed unit for proper operation. One known prior art system identifies objects by providing a plurality of tuned circuits which "load" an oscillator unit, and the amount of loading is greatly affected by the distance between the tuned circuits and the oscillator unit. Another prior art system depends upon an inductive coupling loop on each vehicle to couple two stationary coils as the vehicle passes nearby, and the amount of coupling is critically affected by the distance between the coupling loop and the stationary coils. These prior art systems also may be affected seriously by the presence of foreign bodies, water, ice and other phenomena. The invention avoids the abovementioned difficulties of the prior art in novel manner.

A further important feature of the present invention is that a number of various locations or moving devices may be identified at very low cost. Certain prior art systems require that power sources be furnished both at the point at which information is to be collected and at each movable device which is to be identified. It will be seen that if a large number of separated locations and/or a larger number of independently movable objects are embraced within a system, that installation of power supplies at each location and/or at each movable object may become extremely expensive. The invention utilizes a number of passive units, minimizing the number of required power sources.

Thus it is a primary object of the present invention to provide improved apparatus for automatically identifying, locating, and numbering a plurality of objects.

A further object of the invention is to provide improved apparatus which will automatically provide information at a central location with regard to the identification and/or other conditions of each of a plurality of devices which pass by one or more selected locations.

Another primary object of the invention is to provide improved apparatus which will provide informtion at a moving object with regard to the identification and/or other conditions of each of a plurality of fixed or movable locations relative to which said moving objects may be transported.

Yet another object of the present invention is to provide improved apparatus of the abovementioned nature which is largely unaffected by and capable of accurate, speedy and reliable operation under numerous adverse environmental conditions.

A still further object of the invention is to provide improved apparatus of the abovementioned nature which may be economically constructed, installed and maintained.

Another object of the invention is to provide a plurality of improved component parts which may be incorporated into apparatus constructed in accordance with the invention to provide accurate, reliable, rapid and economical operation.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIGS. 1*a*, 1*b*, 1*c* and 1*d* are electrical schematic diagrams illustrating several exemplary arrangements of the "response block" portions of my invention;

Figures 1A, 1B, 1C, 1D:
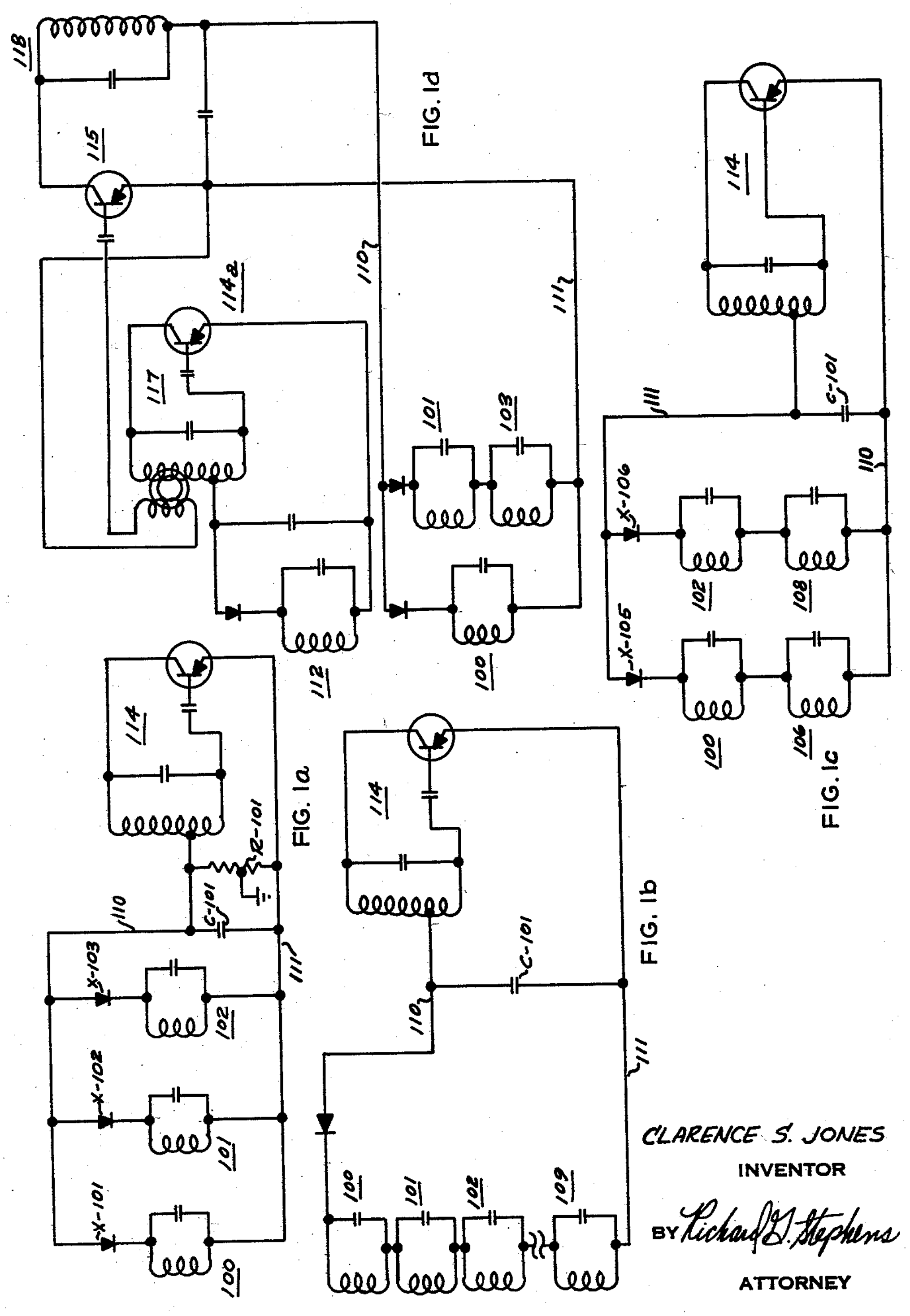

Referring now to FIGS. 1*a*, 1*b* and 1*c* there are shown a plurality of illustrative circuits which may be utilized in the response block portions of the invention. FIG. 1*a* shows a plurality of tuned circuits 100, 101 and 102 each of which are resonant at a different one of the "digit" frequencies. Each tuned circuit comprises a high Q parallel-resonant circuit including an inductance coil and a capacitance. Each inductance preferably comprises a high permeability open core, such as a ferrite core of cylindrical or other desired shape appropriately wound to provide relatively high Q at the frequencies desired. The core may be shaped in accordance with known techniques to optimize the resonant circuit power-pickup efficiency. The mechanical arrangement of an exemplary form of response block is disclosed and explained in connection with FIG. 14. The actual Q required in any one of the resonant circuits may be determined with regard to the minimum band-width required by the particular application of the invention, as will be understood by those skilled in the art. Each resonant circuit is connected through an individual diode rectifier X–101, X–102, or X–103 to a pair of conductors 110 and 111.

When the vehicle-carried radiating coil nears the response block of FIG. 1*a*, and when the interrogator unit supplies the radiating coil with a frequency corresponding to the resonant frequency of any one of the tuned circuits, a considerable alternating voltage will appear across the said one of the tuned circuits, and being rectified by the associated diode in series with the tuned circuit a direct voltage will appear between conductors 110 and 111. A capacitor such as shown at C–101 may be connected between conductors 110 and 111 to reduce the ripple of the direct voltage. It will be understood that the application of any frequency signal from the radiating coil to the response block will induce some voltage in each of the tuned circuits, but that use of high-Q or very selective tuned circuits will make the voltage from the parallel resonant circuit which is tuned to the instantaneously radiated interrogator frequency so greatly exceed the voltages induced in the then "de-tuned" tuned circuits that the latter may be considered negligible. It will be seen that the diodes in FIG. 1*a* serve a dual purpose, both rectifying the alternating voltages developed across the tuned circuits and also serving to prevent the inductance coils of the "de-tuned" parallel circuits from furnishing direct current short-circuit paths between conductors 110 and 111. Each diode will be seen to be poled similarly with respect to conductors 110 and 111.

The direct voltage which appears between conductors 110 and 111 (whenever a frequency corresponding to the resonant frequency of one of the tuned circuits is applied to the response block) may be connected directly to serve as the power source for a responder oscillator 114 shown in FIG. 1*a* as comprising a transistor circuit Hartley-type oscillator. Capacitor C–101 provides a low impedance path between the transistor emitter and the tap shown on the inductor of oscillator 114. The value of C–101 is selected so as to provide a suitable compromise between the impedance requirements of the emitter-to-tap-point path and the desired response block rise time. It will be seen that increasing the capacitance of C–101 decreases the path impedance and increases the response block rise time or time constant. Responder oscillator 114 is tuned to oscillate at a different frequency than any of the above described oscillators or their harmonics, and at approximately 105kc. in the embodiment described herein. While a Hartley-type transistor oscillator is shown in FIG. 1 numerous different oscillators may be substituted. The oscillator chosen merely must be capable of providing sufficient electromagnetic power radiaton at the selected response frequency, and must be efficient enough to provide sufficient output power from the power induced in the response block. In certain embodiments of the invention it will be practical to induce sufficient power in a response block to operate response oscillators having more than a single stage. For example, each response block oscillator system may comprise an oscillator stage and a power amplifier stage.

It is extremely important that no further power supply be necessary to operate the response blocks, and the absence of requirements for a filament supply or "warm-up" time makes semiconductor-type oscillators ideal for practicing the present invention. A number of alternative transistor oscillators which might be used in the response blocks are shown for example, in chapter 14 of "Handbook of Semiconductor Electronics," Hunter, 1st edition, 1956 McGraw-Hill, New York. Certain transistor oscillators require more than two direct voltages, and a voltage divider of ordinary type, such as shown at R–101 may be utilized if desired.

Figure 2:
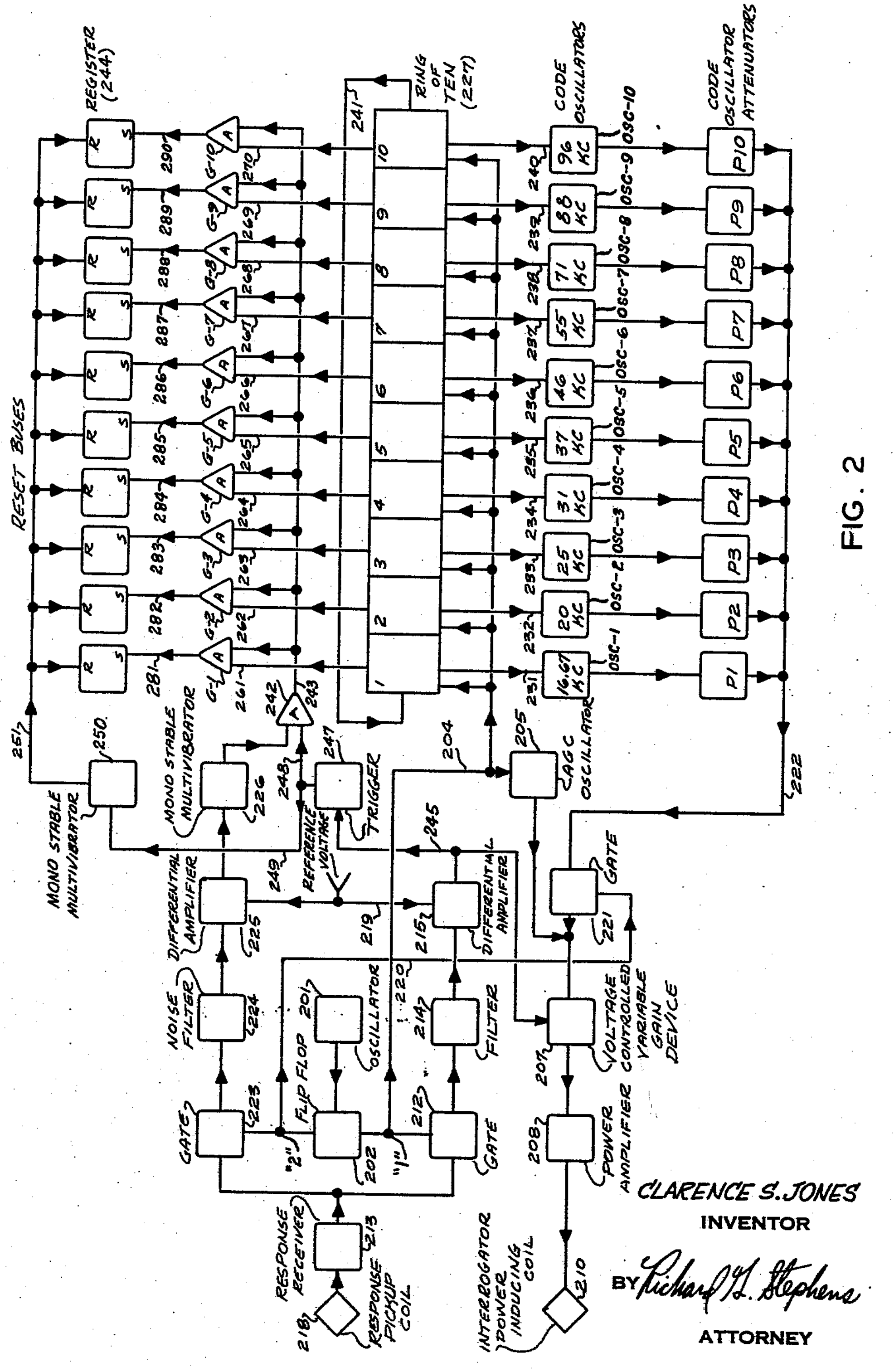
FIG. 2 is a block diagram of a specific embodiment of an exemplary "interrogator" portion of the invention, illustrating one manner in which the invention may be utilized to provide data relating to the location of the interrogator apparatus with respect to a plurality of locations.

The output signal of oscillator 114 is radiated toward and received by a response pickup coil 218 (FIG. 2) carried on the vehicle, as will be explained below in greater detail. Thus it will be seen now that responder oscillator 114 will provide an anwser signal whenever the interrogator unit radiating coil applies a frequency of one of the tuned circuits provided in the response block. Whenever the interrogator frequency differs from each of the frequencies for which tuned circuits are provided, the direct voltage derived between conductors 110 and 111 is insufficient to power responder oscillator 114, so that either an insufficient answer signal or no answer signal from oscillator 114 is induced in response pickup coil 218. By providing a reasonable Q in the response block tuned circuits, the voltage across conductors 110 and 111 will vary sufficiently greatly with frequency that the voltages appearing when none of the response block circuits are tuned to the interrogator frequency will provide small or negligible power answer signals from the responder oscillators. As will be explained below, the response receiver portion of the apparatus is connected to an automatic gain control and arranged so that response signals below a desired threshold level are ignored. While FIG. 2 shows separate power inducing and response pickup coils, it is within the scope of my invention to combine the functions of these two coils into a single coil. Power amplifier 208 and response receiver 213 may be connected to a single coil to energize it and receive response signals from it, respectively. However, isolating means, such as high attenuation filters, for example, may be necessary to protect the response receiver from being over-driven by the power amplifier output signal.

FIGS. 1*b* and 1*c* illustrate several alternative circuit arrangements for the response blocks. In FIG. 1*b* the parallel tuned circuits are connected in series with each other, and in FIG. 1*c* a series-parallel arrangement is shown. It will be seen that the use of series connections as in FIG. 1*b* reduces the number of diodes needed in a given response block, thereby reducing the cost and increasing the reliability of the response block, but decreasing the direct voltage provided by a given energy input to the instantaneously tuned resonant circuit due to the impedance of the other parallel circuits connected in series with the tuned resonant circuit. The impedance of the other parallel circuits depends, of course, both on their selectivities and on their resonant frequencies as compared to the selectivity and resonant frequency of the tuned circuit resonant at the instantaneous interrogator frequency. Thus choice between the alternative circuits illustrated in FIG. 1 depends upon the direct voltage requirements of the particular responder oscillator, reliability and expense of the diodes, the Q's of the various resonant circuits, and the relationship between the various resonant frequencies to be included in a given response block. If the digits to be coded into a given response block relate to widely different frequencies, it will be seen that connection of the parallel tuned circuits in series as in FIG. 1*b* will not result in serious diminution of the derived direct voltage needed to power the transistor oscillator.

An alternative response block arrangement may comprise a continuously powered oscillator operating into a power amplifier which is keyed in accordance with the particular digit frequency being transmitted at a given instant by the interrogator. For example, it may be found desirable in some embodiments of the invention to induce the major portion of the power into the response block at a single frequency. Every response block then may be provided with a tuned circuit resonant at the said single frequency, and the voltage across the tuned circuit may be utilized as the main power supply of the response block. The plurality of tuned circuits in the response block which are resonant at the various digit frequencies may furnish voltages to switch the response block power amplifier on and off. Such an arrangement is shown in FIG. 1*d*. Tuned circuit 112 in FIG. 1*d* is resonant at 66 kc., and upon receipt of a 66 kc. signal from the interrogator unit, power is supplied to operate oscillator stage 114*a*, the output of which is coupled to power amplifier stage 115. Stage 115 is controlled by the voltage appearing across conductors 110, 111 whenever a frequency corresponding to that of one of the tuned circuits 100, 101 or 103 is applied to the response block by the interrogator. The alternative arrangement of FIG. 1*d* specifically illustrates keying of stage 115 by control of the emitter-collector voltage of the power amplifier, but those skilled in the art will recognize that various other keying or gating arrangements may be substituted without departing from the invention. The arrangement of FIG. 1*d* offers the advantage that the major power requirements of the response block may be transmitted at a single "best" frequency, but has the disadvantage that more than one frequency must be supplied to the response block to provide an answer signal. It should be apparent from the above, that, if desired, the arrangement of FIG. 1*d* may be altered to supply oscillator 114*a* from resonant circuits 100, 101 and 103 while supplying power to amplifier 115 from constantly-excited circuit 112. In constructing a response block of the type shown in FIG. 1*d*, I prefer to utilize a closed magnetic non-radiating path at 117 in oscillator 114*a* to minimize interaction between it and the output tuned circuit 118 of power amplifier 115. In utilizing either multi-stage arrangement, the two or more frequencies to be transmitted may be connected to individual power-inducing coils, or, if suitable filters are provided, to common power-inducing coils. Care should be taken that none of any two frequencies transmitted at one time will beat so as to provide one of the other selected frequencies. Proper modification of the gating arrangement to allow simultaneous transmission of two or more frequencies will become obvious in light of the present disclosure.

While FIG. 1 illustrates oscillators powered by the resonant circuits through rectifiers which are separate from the oscillator circuits per se, oscillators capable of direct use of the alternating voltages from the tuned circuits are known and may be substituted. Also, while parallel resonant circuits are shown in FIG. 1, it will be obvious to those skilled in the art that series resonant circuits may be substituted without departing from the invention. In either case, the tuned circuit impedances at resonance may be matched to their load, the response block oscillator, so that maximum power transfer may occur. Circuit Q's (including the oscillator load) of the order of 20–100 may be maintained without difficulty. Under such conditions the resonant frequencies for maximum power, maximum current and maximum voltage all substantially coincide. Parallel resonant circuits usually will be preferred when matching a higher impedance load, and series resonant circuits to match lower impedance loads. Matching is not critical, since the load presented by the oscillator varies, tending to match the circuit impedances automatically.

An important feature of the present invention is that each response block be a "passive" unit, requiring no self-contained source of power such as a battery nor any external connections to an outside power source. Designation of the response blocks as "passive" is not intended to preclude the use of small bias cells or similar devices in locations where their current drain would be negligible during the desired life of a response block, but no such auxiliary voltages sources are necessary, and I prefer to avoid them entirely by use of wholly passive response block units.

Referring now to FIG. 2, an audio frequency voltage source shown in block form as a 400 cycle oscillator 201 is used to drive a bi-stable switching device shown in block form at 202. Source 201 may take a variety of forms. An exemplary oscillator which may be used in practicing the invention is shown and described below in connection with FIG. 11. The bi-stable device may comprise a conventional Eccles-Jordan flip-flop circuit, for example, thereby alternating output terminals "0" and "1" of the bi-stable device between "high" and "low" conditions at the 400 cycle repetition rate of source 201. An exemplary form of switching device which may be used as element 202 is the bi-stable flip-flop shown and described below in connection with FIG. 10. The frequency stability of voltage source 201 is not critical, although the operation of filter 214 is optimum at a single frequency and extremely wide deviations in the timing frequency cannot be tolerated. Whenever terminal 1 of flip-flop 202 is high, the voltage applied via conductor 204 to automatic gain control oscillator 205 serves to gate on oscillator 205, which, in the embodiment being described, is tuned to oscillate at 66 kc. Oscillator 205 may comprise a continuously operating oscillator having its output connected to variable gain device 207 through a separate gate controlled by the signal on conductor 204, or alternatively, oscillator 205 may comprise a type of oscillator which oscillates only when the voltage on conductor 204 is high.

When oscillator 205 is gated on, the 66 kc. signal from the oscillator is applied through a voltage-controlled variable-gain device shown in block form at 207, and through a power amplifier shown in block form at 208 to the interrogator power inducing or radiating coil 210. The voltage-controlled variable-gain device 207 may take a variety of forms, such as a variable-gain amplifier or a variable-gain attenuator. An exemplary form of variable-gain attenuator is described below in connection with FIG. 13. Simultaneously the "high" voltage on conductor 204 opens gate circuit 212, thereby connecting the output circuit of response receiver 213 through low pass filter 214, which is tuned to pass frequencies below approximately 200 cycles in the device shown, to differential amplifier 215. Filter 214 is provided with an effective time constant such that the output voltage from this filter does not contain any appreciable amount of the 200 cycle sampling frequency provided by operatioin of gate 212 in applying automatic gain control, or "AGC" signals 200 times per second to the input circuit of the filter. Filter 214 may be designed in accordance with known techniques to provide a maximum band width of 100 cycles for the AGC signals. Maximum band width is desirable in order to provide minimum response time for the AGC circuit, which may be especially desirable when the invention is utilized in connection with the identification of rapidly moving objects. It will be seen that differential amplifier 215 receives a first input signal from filter 214 that is commensurate with the magnitude of the 105 kc. input signal induced in response pickup coil 218 while the voltage on conductor 204 is high, and a second input signal on conductor 219 commensurate with a selected reference voltage. When the voltage output from response receiver 213 increases above a desired level, differential amplifier 215 controls variable-gain device 207 so as to reduce the voltage applied to power amplifier 208, thereby reducing the power induced into the response pickup coil. Thus it will be seen that over a given range of response coil input voltages, the voltage from the response receiver may be controlled so as to remain essentially constant. As a vehicle carrying the interrogating unit physically approaches a response block, if the response block responder oscillator output and the interrogator oscillator power output remain constant, the voltage induced in the response pickup coil by the responder oscillator would increase until the interrogator inducing coil 210 is at minimum distance from the response block, and then decrease as the interrogator coil begins to move away in the opposite direction, in a manner illustrated by curve "*a*" of FIG. 3. By provision of the automatic gain control circuit described above, the amount of power applied to the interrogator inducing coil 210 is controlled so that response receiver output is maintained at a nearly constant level, as indicated in curve "*b*" of FIG. 3. Thus it will be seen that during the "high" or binary "1" state of flip-flop 202, that a 66 kc. "test" frequency is applied from the interrogator power-inducing coil 210 to the response block, and the gain of device 207 is determined in accordance with the amount of response frequency transmitted to coil 218. The gain of device 207 determined during this portion of the operating cycle is maintained during transmission of interrogator code or digit frequencies by means of filter 214, as previously explained, thereby maintaining the response receiver output voltage essentially constant, as indicated at "*b*" in FIG. 3, whenever one of the digit frequencies is causing transponder oscillator 114 of the response block to supply the answer frequency.

Response pickup coil 218 is broadly tuned at 105 kc. and connected to feed response receiver 213, which may comprise a conventional receiver having one or more tuned amplifier stages and a demodulator. In construction of the specific embodiment described, receiver 213 may include for example, a low-noise preamplifier stage coupled directly to response pickup coil 218. The preamplifier may include a tuned circuit coupled to drive several further cascaded amplifier stages, which may ultimately supply a bridge diode demodulator of conventional construction. The further amplifier stages also may be tuned. One or more of the amplifier stages of response receiver 213 may include conventional variable gain features. For example, if vacuum tube amplifiers are used, variable mu tubes may be provided. In certain embodiments of the invention it may be advantageous to apply a portion of the output voltage from filter 214 to control the gain of one or more stages of the response receiver, thereby providing a measure of automatic gain control within the response receiver itself. Use of such additional automatic gain control will improve the signal-to-noise ratio of response receiver 213, and also allow use of a simpler variable gain device at 207. It will be understood that if part of the required gain control is accomplished within response receiver 213, that a variable gain device having a smaller dynamic range and attendant lesser distortion and noise will be acceptable. Numerous types of receiver circuits are well known and may be substituted. The specific embodiment constructed utilized transistor amplifiers. Response receiver 213 supplies a direct voltage output to gates 212 and 223.

During each binary "0" state of flip-flop 202, the "high" voltage on terminal "0" of flip-flop 202, which is applied via conductor 220 to gate 221, opens gate 221 and allows the particular code oscillator frequency then present on conductor 222 to be applied through variable-gain device 207 and power amplifier 208 to interrogate power-inducing coil 210. Simultaneously the "high" voltage on terminal "0" of flip-flop 202 opens gate 223, applying the demodulated response receiver output voltage through low-pass noise filter 224 in differential amplifier 225. Differential amplifiers 215 and 225 may each take a variety of forms. An exemplary form of differential amplifier is shown and described in connection with FIG. 9, but numerous other types may be substituted. The output voltage from differential amplifier 225 is applied to fire monostable multivibrator 226. The low output voltage on terminal "1" of flip-flop 202 may be simultaneously routed to the ring advance line 204 of a conventional "ring of ten" pulse counter 227 shown in block form in FIG. 2. Low-pass noise filter 224 is provided so as to greatly attenuate frequencies above 800 cycles, thereby to reduce noise in the signal fed to differential amplifier 225, by effectively reducing the response receiver bandwidth to a minimum acceptable value. An exemplary circuit suitable for use as ring-of-ten pulse cycling means 227 is shown and described in connection with FIG. 4, but a number of alternative cycling means may be substituted without departing from the invention.

Each time flip-flop 202 changes to its "1" state, so that the voltage on its terminal "0" becomes low and the voltage on its terminal "1" becomes high, ring counter 227 is advanced one position, turning off the code oscillator which had been oscillating and turning on the next code oscillator. Each stage of counter 227 is connected to one of the ten digit code oscillators (labelled OSC–1 through OSC–10 in FIG. 2), conductor 231 connecting stage 1 of counter 227 to digit 1 code oscillator OSC–1, conductor 232 connecting stage 2 to digit 2 code oscillator OSC–2, etc. For example, assume that flip-flop 202 is in its zero state, and that the count in ring counter 227 is in the first position. The voltage on conductor 231 will be "high," actuating 1st digit code oscillator OSC–1, which will apply its output signal, the amplitude of which is controlled by an adjustable attenuator P–1, to conductor 222. As source 201 provides flip-flop 202 with the opposite half-cycle of the 400 cycle timing signal, flip-flop 202 will switch to its "1" state, causing automatic gain control operation as described above, and also applying an advance pulse to counter 227 via conductor 204, so that the ring advances one position, conductor 231 of counter 227 going "low" and conductor 232 becoming "high," so that oscillator OSC–1 is disabled and second digit code oscillator OSC–2 is operated.

With a 400 cycle per second signal applied from source 201 to flip-flop 202, it will be seen that there will be 200 "1" states and 200 "0" states at flip-flop 202 during every second, each "1" state and each "0" state having a duration of 2500 microseconds. Thus it will be seen that automatic gain control oscillator 205 will be pulsed for 2500 microsecond intervals at a repetition rate of 200 times per second. The 200 "0" states of flip-flop 202 will be divided among the ten stages of cycling means 227, so that each digit code oscillator will be operated for a 5000 microsecond interval at a repetition rate of 20 times per second, since the operating voltages on conductors 231 through 240 advance once every 5000 microseconds. The code oscillator output voltages on conductor 222 are passed by gate 221 only during the "0" state of flip-flop 202, however, so that the signals applied to variable-gain amplifier 207 consist of alternate 2500 microsecond bursts from automatic gain control oscillator 205 and successive "digit" frequency bursts from the code oscillators. It will be understood now that the ten code oscillators transmit successively in the embodiment shown with a 2500 microsecond automatic gain control interval between each pair of successive code oscillator transmissions. While FIG. 2 illustrates apparatus in which the code oscillators oscillate during the automatic gain control portion of the timing cycle but are gated through only during the digit frequency portion of the cycle, it may be desirable in some embodiments of the invention to eliminate gate 221, and to modify ring-of-ten 227 so that the voltages applied to the code oscillators via conductors 231 through 240 operate the code oscillators only during the "0" state of flip-flop 202. Such a technique is described below.

Figures 8, 11, 12:
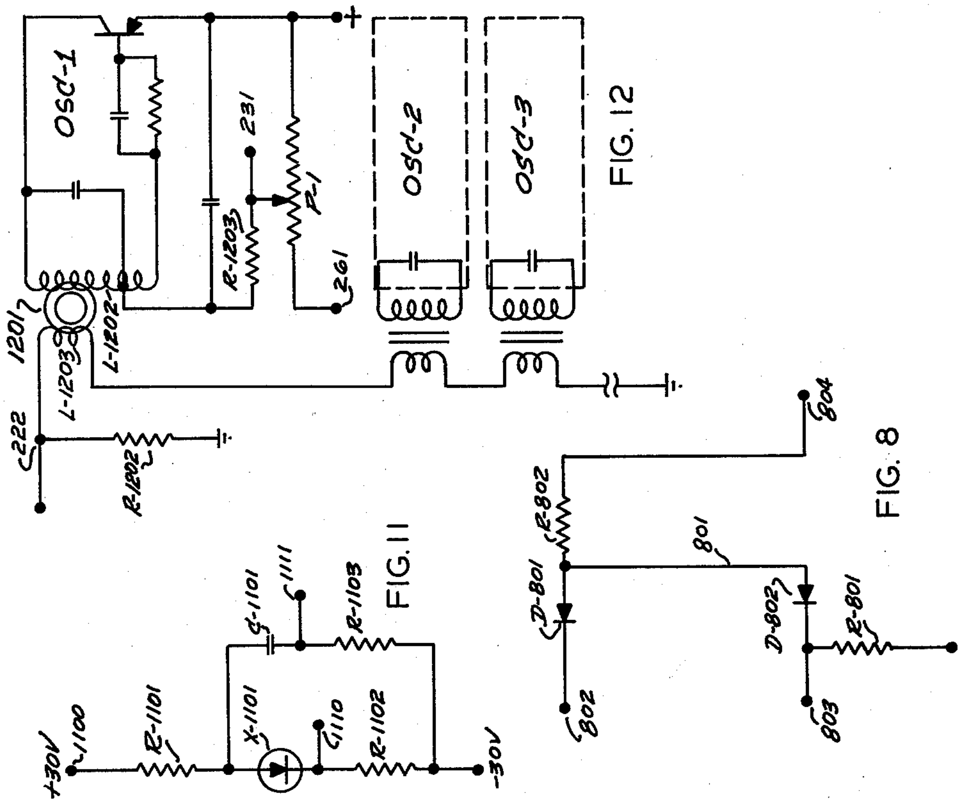

Each code oscillator may be connected through an individual adjustable attenuator, P–1 through P–10, which may comprise an ordinary variable potentiometer adjustable to determine the amplitudes of the oscillator frequencies on line 222. Attenuators P–1 through P–10 allow adjustment so that uniform response block voltage is induced for the different oscillator frequencies. If desired, the means utilized to adjust the amplitude of the oscillator output signals may be incorporated within the oscillator circuits, as shown in FIG. 12, rather than by use of external potentiometers. Furthermore, numerous other methods of adjusting oscillator output amplitude are known. An exemplary circuit illustrating how each code oscillator signal may be applied to bus 222 is disclosed and explained in connection with FIG. 12.

As each of the code oscillators transmit, if a corresponding resonance circuit is available in a response block near which the interrogator is located, the responder oscillator of the response block will provide an answer signal to cause an output from receiver 213, operating monostable multivibrator 226 as described above through gate 223, filter 224 and differential amplifier 225. In order to fire monostable multivibrator 226, an input voltage above a minimum threshold value is necessary. Differential amplifier 225 is provided with a reference voltage input, so that no output signal is applied to multivibrator 226 unless the input voltage to amplifier 225 on conductor 242 exceeds a predetermined amplitude determined by the reference voltage. Hence the system ignores response receiver outputs below the threshold value, not firing multivibrator 226 unless the strength of the received transponder signal is suitably strong. This arrangement prevents noise and random disturbances from affecting operation.

The output terminal of monostable multivibrator 226 is connected to coincidence or "and" circuit 242, the output circuit of which is connected via conductor 243 to one input line each of ten further "and" circuits, one each of the ten further "and" circuits being individual to and connected to be operated by output voltages from one of ten stages of counter 227. If cycling ring 227 is in the "one" position, for example, an actuating voltage will be applied to digit 1 "and" gate G–1 via conductor 261, and upon application of a signal from multivibrator 226 via gate 242 to conductor 243, digit 1 "and" gate G–1 will provide an output signal on conductor 281 to operate a register shown in block form at 244. Inasmuch as no actuating voltages will be present on conductors 262 through 270 when ring 227 is in its "one" position, "and" gates G–2 through G–10 will not provide output pulses, and no signals will be applied to register 244 from any of conductors 282 through 290.

Figures 3, 5, 6, 13:
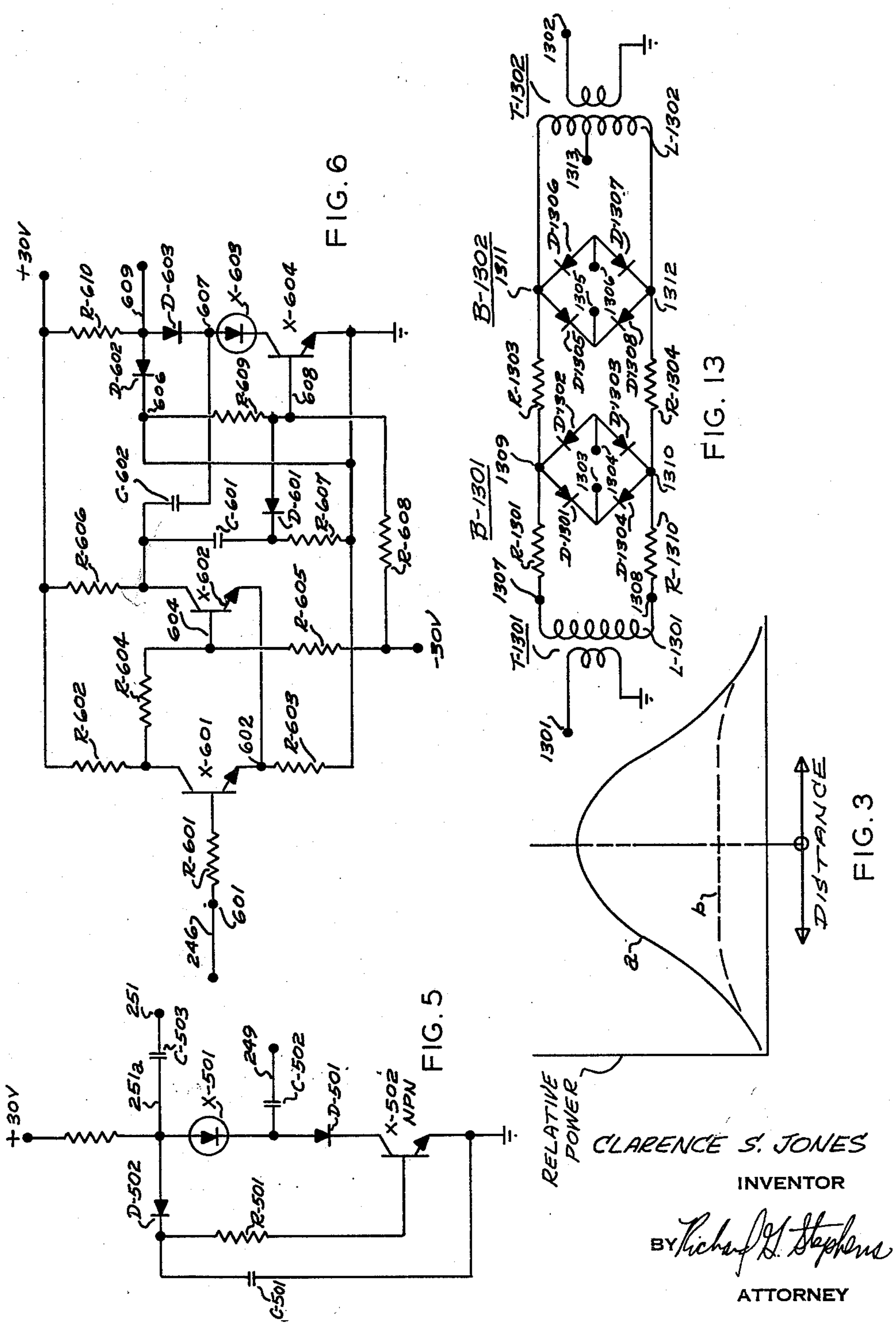
FIG. 3 is a graphical illustration useful in understanding operation of the automatic gain control feature of the invention.
FIGS. 4 through 13 are electrical schematic diagrams illustrating exemplary component circuits which may be used in connecting apparatus in accordance with FIG. 2.

To insure proper operation of register 244, it is highly desirable to insure that the response block is transponding in the "flat" power region of curve *b* of FIG. 3 before allowing information to be set into the register. The output voltage from differential amplifier 215 of the automatic gain control loop may be applied via conductor 246 to fire a re-settable trigger circuit 247 whenever the automatic gain control circuit begins to decrease the gain of variable-gain amplifier 207 beyond a selected amount. It will be recalled that differential amplifier output-voltage begins to increase, so as to decrease the gain of amplifier 215, only after the response receiver output signal applied via filter 214 has exceeded the arbitrary threshold determined by the magnitude of the reference voltage from conductor 219. Therefore, upon sufficient output signal from response receiver 213, trigger circuit 247 will fire, applying its output signal via conductor 248 to "and" gate 242, and via conductor 249 to a further monostable multivibrator 250. Since the output signals which exist from monostable multivibrator 226 are applied to the individual digit "and" gates (G–1 through G–10) through "and" gate 242, a fired condition of trigger circuit 247 is necessary in order to allow transmission of data to register 244. Inasmuch as sufficient signal strength is necessary to fire triggger 247, it will be appreciated that register 244 will not be pulsed unless the response signals are of sufficient strength.

The output signal pulse appearing on the output conductor 251 of monostable multivibrator 250 each time trigger circuit 247 fires is applied to the reset buss 251 of register 244, thereby removing any numbers previously stored in the register in order that new data may be entered. When the voltage from differential amplifier 215 fires the trigger, the latter stays fired until either a selected time interval has elapsed or until the output voltage from differential amplifier 215 is of such magnitude and polarity as to indicate that the response signal strength is not sufficient. In the embodiment described herein, the time interval selected was of the order of 100 milliseconds.

Assuming that the interrogator approaches a response block, as the interrogator power-inducing and response pickup coils become sufficiently close to the response block, amplifier 215 will provide a gain control output voltage. The trigger will be fired as soon as the gain control output voltage reaches a predetermined value, and assuming that response receiver output does not first decrease so as to decrease the voltage on conductor 246 below a certain value, trigger circuit 247 will remain fired, maintaining an input signal on input line 248 of gate 242, and applying a constant voltage into monostable multivibrator 250. The output signal of multivibrator 250 will consist of a short initial pulse when trigger 247 fires to reset register 244. A constant voltage being maintained on reset buss 251 during a given time interval insures that register 244 will not be reset during such time interval. Being fired at the beginning of the first AGC half-cycle occurring during sufficient signal strength conditions, trigger 247 will remain fired for about 100,000 microseconds, during which time the first AGC half-cycle of 2500 microseconds, a code oscillator transmission period of 2500 microseconds, a further AGC period of 2500 microseconds, code oscillator transmission period of 2500 microseconds, a further AGC period of 2500 microseconds, and a further code oscillator transmission period of 2500 microseconds will occur and so forth, until approximately 100,000 microseconds have elapsed, so that each digit will have been transmitted twice. The 100,000 microsecond interval will be seen to be a matter of choice and in certain applications of the invention it may be desirable either to shorten or lengthen the time interval. It will be seen that provision of trigger 247 increases system reliability by positively controlling the register over a period long enough for each digit frequency to be transmitted at least once. If the signal path to register 244 could be opened and closed by minor fluctuations of the AGC control voltage, the path to register 244 might be opened and closed during a single 50,000 microseecond interval possibly resulting in a wrong number in register 244.

If the interrogator apparatus has not been moved away from the response block by the end of the 100,000 microsecond period, the voltage on conductor 245 will remain at or above the value initially necessary to fire trigger 247, but trigger 247 returns to its initial state anyway. Even though the AGC voltage on conductor 245 remains high, trigger 247 will not fire, so that register 244 will not be continually reset during the time that the interrogator is located at or near a response block. As soon as the interrogator does move away, however, so that the AGC voltage on conductor 246 decreases sufficiently, trigger 247 will be able to fire again when the AGC voltage is subsequently raised to the threshold level, closing gate 242 and resetting register 244.

While the use of separate code oscillators is disclosed in FIG. 2 and is preferred, it is possible and within the scope of this invention to utilize a single variable frequency oscillator either poised at different frequencies or gated at different frequencies. Cycling means 227 provides output signals which may be used to either key such an oscillator or to control a gate, and also voltages which are suitable to synchronize a sweep frequency oscillator. However, unless the sweep frequency oscillator frequency is varied in steps rather than continuously, each code transmission period will utilize a signal burst having a continuously varying frequency, which will complicate transmitter system filtering and may require less selective, more broadly tuned circuits in the response blocks.

FIGS. 4 to 7 and FIG. 10 illustrate a number of exemplary component circuits utilizing four-layer PNPN semiconductor diodes. Upon application of voltages below a critical value across such diodes they offer very high impedance, but application of a voltage higher than the critical value across such diodes results in heavy current flow, with a very low voltage drop existing across the diodes. If the voltage across a PNPN doide is raised in the forward direction, very little current will flow until exceeding the critical voltage causes the diode to break down, the diode thereafter remaining in a highly conductive condition as long as a minimum necessary current flow is maintained through it. If the external circuit voltage decreases or if the external circuit impedance increases sufficiently that the minimum current cannot be maintained, the diode will revert to its original high impedance state. FIGS. 8, 9, and 11–13 illustrate other exemplary component circuits which may be used. In describing the operation of some of the circuits, exemplary voltages are assumed for convenience in explanation.

Figures 4, 7:
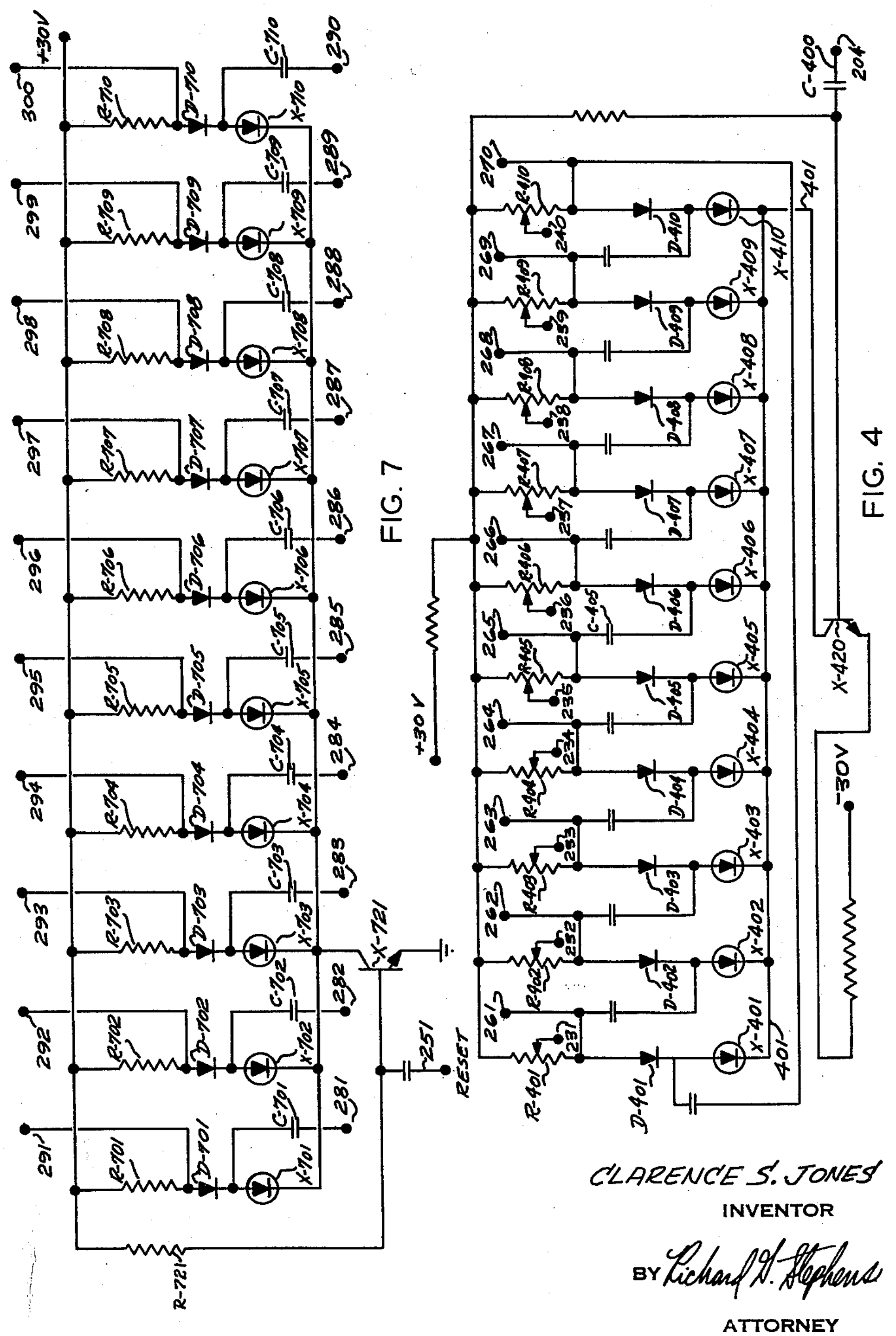

FIG. 4 is an electrical schematic diagram illustrating an exemplary ring-of-ten counter circuit which may be used as the cycling means 227 of FIG. 2. It will be recalled that voltage is applied to ring 227 via ring advance conductor 204 whenever flip-flop 202 switches to a digit frequency transmission interval. Assuming no pulse input on conductor 204, it will be seen that application of sufficient supply voltage to the circuit of FIG. 4 may be such that it will cause one of the ten PNPN diodes (shown as X–401 through X–410) to conduct. The PNPN diode having the lowest breakdown voltage will conduct first. Assuming that PNPN diode X–405 has the lowest breakdown voltage, it will fire as supply voltages are applied to the circuit, causing current to flow through diode X–405, diode D–405 and load resistor R–405, and thereby causing a substantial drop in potential at the junction between diode D–405 and resistor R–405. Junction 265 is connected to coupling capacitor C–405, so that conduction of X–405 and the consequent drop in potential charges capacitor C–405. The low voltage at junction 265 will indicate that a count of "five" exists in the ring. As a negative-going input pulse is applied to the base of NPN transistor X–420 the transistor will be cut off, cutting off the current theretofore flowing in X–405, but leaving coupling capacitor C–405 charged. At the end of the input pulse on conductor 204 current flow will be re-established through transistor X–420, raising the voltage on conductor 401. Being biased by the negative voltage from capacitor C–405, PNPN diode X–406 will conduct first as the voltage on 401 rises, and it will be seen that the count then will have been advanced one unit. Thus each time an input pulse is applied to conductor 204, the ring counter is advanced one step. The output voltages may be taken as shown from conductors 261 through 270 to operate "and" circuits G–1 through G–10 shown in FIG. 2. Various other counter circuits, all known to those skilled in the art, may be substituted without departing from the invention.

FIG. 5 is an electrical schematic diagram illustrating an exemplary form of monostable multivibrator which may be used as elements 226 and 250 in constructing the apparatus of FIG. 2. In the steady-state condition, with no input signal applied on terminal 249, PNPN diode X–501 remains non-conducting. Application of a negative pulse on line 249 via coupling capacitor C–502 causes diode X–501 to fire. Diode D–501 isolates the input pulse from transistor X–502. Current then flows through transistor X–502, which is heavily "biased on" through load resistor R–501 and diode D–502, so that the potential at terminal 251 falls to a low value represented only by the voltage drops across the three semiconductor devices (X–501, X–502 and D–501) and ground. Diode D–502 will uncouple then, allowing the current applied from capacitor C–501 through R–501 to the base of X–502 to decay in a time determined by the RC time constant of resistor R–501 and capacitor C–501. When the base current of transistor X–502 reaches a point such that collector current becomes less than the minimum or threshold current value of PNPN diode X–501, the current through diode X–501 is extinguished as the circuit resets itself and stands ready for the next input pulse.

FIG. 6 illustrates an exemplary re-settable trigger circuit which may be employed as element 247 of FIG. 2. This switching circuit is designed to be capable of both Schmidt trigger type of operation but also to be re-settable at any time if the input voltage varies. It will be recalled that the voltage on conductor 246 has a magnitude and polarity commensurate with the strength of the received signal from the response block, less a threshold value determined by the reference voltage applied to differential amplifier 215. Assuming a zero voltage on conductor 246 transistor X–601 will be nonconducting, the potential at terminal 602 lying at approximately +5 volts due to a 10 milliampere current flowing through transistor X–602 and common emitter resistor R–603, and the collector voltage of transistor X–602 lying at approximately +5.5 volts due to current flow through resistor R–606. The collector voltage of transistor X–601 will be approximately +28 volts, while the base voltage of transistor X–602 will be near zero. As the input voltage on conductor 246 is raised to near +5 volts or greater, current will begin to flow through base resistor R–601 into the base of transistor X–601, causing a collector current to flow in transistor X–601 through resistor R–602 and into resistor R–603, and thereby dropping the collector voltage of transistor X–601. The X–601 collector voltage is applied to the X–602 base through a voltage divider consisting of resistors R–604 and R–605. Lowering of the X–602 base voltage will cause further drop in the X–601 emitter voltage due to reduction in current flow through transistor X–602. Reduction in the X–601 emitter voltage will cause further and increasing current flow through resistor R–601 into the base of transistor X–601, and it will be seen that the states of the two transistors will be switched rapidly, so that X–601 now will be conducting and X–602 will not be conducting. The X–601 collector voltage will have dropped from +28 to +2 volts, the X–602 collector, voltage will have risen from 5.5 volts to nearby +30 volts, and the X–602 base voltage on conductor 604 will be approximately 4 volts negative.

If the input voltage on conductor 246 now is lowered from +5.5 or above to about +1.5 volts or below, current flow through resistor R–601 will begin to diminish thereby reducing X–601 collector current and raising X–601 collector voltage, which will act through the R–604—R–605 voltage divider to raise the X–602 base voltage. Raising the X–602 base voltage will cause a reduction in X–602 base current, and consequent reduction in X–602 collector current. Less X–602 collector current results in a higher X–601 emitter voltage due to drop across resistor R–603, further diminishing the input signal current applied to the X–601 base, so that the two transistors will return to the original states. Thus it will be seen that transistors X–601 and X–602 will operate in Schmidt trigger fashion as the input signal on conductor 246 is raised and lowered. In the initial or steady-state condition a small current flow exists from the positive supply terminal through resistor R–610, diode D–602, resistor R–609 and transistor X–604. Resistor R–610 is much smaller than resistor R–609, so that a potential of the order of 28–29 volts exists at terminal 609.

The increase in X–602 collector voltage as a positive input is applied via R–601 is coupled through capacitor C–602 to terminal 607, the junction point between conventional "two-layer" diode D–603 and PNPN or "four-layer" diode X–603. Therefore the voltage across X–603 will have been below its critical or "firing" value, but the voltage applied via capacitor C–602 will raise terminal 607 high enough to "fire" diode X–603. Heavy current will flow through resistor R–610, diode D–603, PNPN diode X–603 and transistor X–604 to ground, reducing the potential at terminal 609 from about +30 volts to the very small drop existing across diodes D–603 and X–603 and transistor X–604. At the same time, diode D–602 will become biased in a negative direction, so that the potential at terminal 606 will begin to decay exponentially due to discharge of capacitor C–603 through resistor R–609. The current in R–609 will decrease until such time that transistor X–604 becomes unsaturated, and the X–604 collector current then will begin to diminish. When the X–604 collector current has fallen to an amount less than the holding current of PNPN device X–603, the PNPN device will extinguish, thereby rapidly restoring the potential at output terminal 609 to its original value, and also charging capacitor C–603 through diode D–602 and resistor R–610. Resistor R–608 serves to linearize the exponential decay of current through R–609 by allowing the base voltage of transistor X–604 to reach cutoff more rapidly as capacitor C–603 discharges.

If the input voltage on conductor 246 should drop below approximately +1.5 volts before C–603 has discharged sufficiently to reduce X–604 collector current below the X–603 maintaining current, transistors X–601 and X–602 will change states in the manner described above, whereupon the X–602 collector voltage will fall rapidly, driving terminal 610 down to a negative voltage of approximately −25. The negative drop is coupled through diode D–601 to the base of transistor X–604, thereby cutting off X–604 extremely rapidly, so that PNPN diode X–603 is immediately extinguished. Output terminal 609 will be raised quickly back to its maximum value. D–601 is included in the circuit to block the flow of base current from the transistor X–604 base to emitter junction at the time that the X–603 collector voltage rises from approximately +5 to +30 volts. Although coupled through capacitor C–601, the X–602 collector voltage rise is not coupled to the base of transistor X–604, being blocked by diode D–601. However, if the X–602 collector voltage falls in the negative direction, diode D–601 will couple a pulse to the base of transistor X–604 and transistor X–604. It will be seen that if the input voltage on conductor 246 is raised to about +5 volts or above, a negative output pulse will appear output terminal 609 for a period of time determined by either (1) the RC time constant of capacitor C–603 and resistor R–609, or, (2) any time at which the input voltage on conductor 246 is subsequently lowered to a value of less than about +1.5 volts.

FIG. 7 is an electrical schematic diagram illustrating an exemplary register comprised of 10 stages which may be used as the register 244 of FIG. 2. It will be recalled that voltage pulses are applied to the sections of the register on conductors 281 through 290. These "set" pulses are applied individually to the junctions between ten series connected sets of diodes D–701 through D–710 and PNPN diodes X–701 through X–710 as shown in FIG. 7. The relative position of the two diodes of any stage may be reversed, if one desires to reverse the required polarity of the "set" pulse.

When supply voltage is initially applied to the register, none of the PNPN diodes will conduct. Transistor X–721 is biased and held its conducting state by the current through resistor R–721. If a sufficiently large pulse is applied at the junction between any PNPN device and its associated diode, the PNPN device will then be caused to fire and will conduct through the associated diode and heavily conducting transistor X–721, causing the junction between the regular diode and its associated load resistor to drop in potential to a value determined only by the small voltage drops across the two diodes and the transistor. Each stage of the register may be set independently in the same manner. The entire register may be "reset" by application of a negative pulse to the base of the normally heavily conducting NPN transistor X–721 from conductor 251. This negative pulse will cut off the collector current of the transistor, causing each of the PNPN devices to extinguish, thereby resetting all stages of the register. A number of alternative register circuits are known in the art and may be substituted without departing from the invention.

An exemplary form of diode "and" gate is illustrated in FIG. 8, although various alternatives are known and may be substituted. Distinction is made herein between "*gates*" and "and *circuits*." Elements 212, 221 and 223 are *gates*, while elements 242 and G–1 through G–20 are "and" *circuits*. The gates receive a signal input which may vary in magnitude throughout a continuous range of values, and upon application of a control signal the signal input appears at the output terminals of the gate with the analog magnitude of the signal input preserved. The "and" circuits receive two signal inputs, and if the signal inputs are applied simultaneously or coincidentally to the "and" circuit, an output signal will appear at the output terminals of the "and" circuit, but the amplitude of output signal may or may not be related to the input signals. In FIG. 8, if control input terminal 804 is at −15 volts, application of a signal input within the range of +10 to −10 volts at signal input terminal 802 will not result in conduction of diode D–801 or D–802, since they always will be reverse-biased by at least 5 volts. If, however, the switching input voltage at terminal 804 is changed to +15 volts, current will flow through diode D–802 throughout the signal input range of plus or minus 10 volts, causing the voltage on conductor 801 to rise to the value of the signal input voltage at point 802. With conductor 801 held at signal input voltage level, current will flow through diode D–802 and load resistor R–801, so that the output voltage at terminal 803 will be equal to the input voltage at terminal 802. Resistors R–801 and R–802 are provided with sufficient resistance to prevent the signal input source at terminal 802 from being appreciably loaded.

Figure 9:
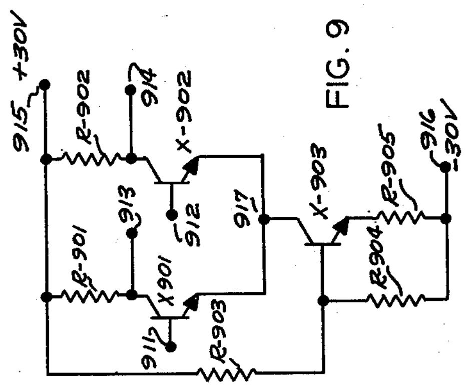

FIGURE 9 is an electrical schematic diagram illustrating an exemplary differential amplifier circuit which may be used as the differential amplifiers 215 and/or 225 in FIG. 2. The amplifier comprises three NPN transistors X–901, X–902, X–903 and resistors R–901 through R–905. These devices are connected as shown on FIG. 9 between the positive voltage source of 30 volts at point 915 and a negative voltage supply terminal 916. Transistor X–903 is connected with positive bias on its base obtained through the voltage dividing network comprising resistors R–903 and R–904. The total emitter current for transistor X–903 flows through resistor R–905 in such a manner that degeneration establishes a constant current flow from the collector of transistor X–903 to terminal 917. Under all input conditions the current flow from transistor X–903 to terminal 917 is constant. Part of the current flows through transistor X–901 and part through transistor X–902. The ratio of the current division is dependent upon the voltages applied to input terminals 911 and 912. The current flowing through transistor X–901 also flows through load resistor R–901 and the current flowing through transistor X–902 flows through load resistor R–902. The voltages appearing at terminals 913 and 914 are inverted in phase, and proportional to the difference between the voltages applied at input terminals 911 and 912. Transistor 903 and its associated resistors R–903, R–904 and R–905 act as a constant current source, so that the amplifier measures only the difference between two applied input voltages at terminals 911 and 912, and not the average voltage applied to these points. Outputs may be taken from terminal 913 or terminal 914 depending upon the desired polarity of the output signal. In applying the circuit of FIG. 9 to the system of FIG. 2, the reference voltage of conductor 219 may be connected to terminal 911, while the pickup signal voltage from filter 214 (or 224) may be connected to terminal 912, or since the two halves of the differential amplifier are similar, these connections may be interchanged, with output polarity reversal resulting.

Figure 10:
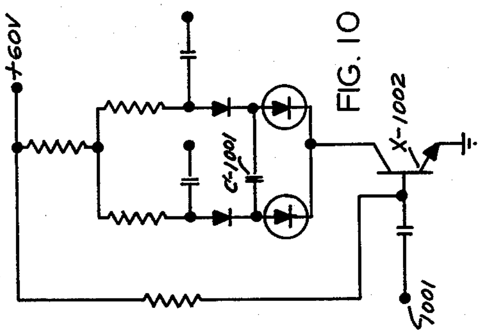

FIG. 10 is an electrical schematic diagram illustrating an exemplary flip-flop circuit which may be used as the flip-flop timing means 202 of FIG. 2. This circuit operates in exactly the same manner as the "ring-of-ten" described in connection with FIG. 4, but comprises a "ring-of-two." The coupling capacitor C–1001 is connected between the junction of the PNPN diodes and the conventional or signal junction diodes in such a way that symmetry is preserved. A "count" is transferred from one stage to the other as transistor X–1002 is periodically cut off by negative input pulses to its base from input terminal 1001.

FIG. 11 is an electrical schematic diagram illustrating an exemplary pulse oscillator which may be used as oscillator 201 of FIG. 2. Upon application of supply voltage to terminal 1100, a current flows through resistor R–1101, charging capacitor C–1101 to a voltage which eventually reaches the firing voltage of PNPN diode X–1101. At such time diode X–1101 breaks down or "fires," allowing a large current to flow from capacitor C–1101 through resistors R–1103 and R–1102, causing a positive voltage spike to appear at terminal 1110 and a negative voltage spike to appear at terminal 1111. These spikes may be capacitively coupled to further circuitry. The frequency of the oscillator is determined primarily by the RC time of resistor 1101 and capacitor 1101, although slightly affected by the values of resistors R–1102 and R–1103.

FIG. 12 is an electrical schematic diagram illustrating an exemplary type of oscillator circuit which may be used for oscillators OSC–1 through OSC–10 and AGC oscillator 205 of FIG. 12 and which also illustrates how the output signals from the oscillators may be combined and applied to bus 222. Oscillator OSC–1 is shown as comprising a conventional Hartley-type, using a tapped inductor L–1202 wound on a toroidal core 1201 and provided with a low impedance secondary winding L–1203 which serves as the output coil. Supply voltage for oscillator OSC–1 is shown as being derived from potentiometer P–1, one terminal 231 of which corresponds to the output conductor 231 of cycling means 227 (see FIGS. 2 and 4). The output coils of each of the code oscillators may be connected in series to provide a common output terminal as shown at 222. In order to provide minimum signal attenuation, the resistance of resistor R–1202 should be large compared to the total impedance of the output coils of the oscillators. The supply voltage connected to oscillator OSC–1 is determined by adjustment of potentiometer P–1, thereby determining the amplitude of the oscillations. Resistor R–1203 serves to isolate oscillator OSC–1 from its power source, which is shown as comprising the output circuit of stage "1" of ring 227. If desired, the secondary winding of oscillator 205 also may be connected in series with the other secondary windings if means are provided to prevent code oscillator transmission during the AGC portion of the timing cycle. Coupling of the voltage from flip-flop 202 to the ring advance bus 204 through direct coupling or a large capacitor will effect such operation.

Referring now to FIG. 13, there is shown an exemplary variable gain device, which may be used at 207, FIG. 2. An alternating input signal voltage is applied to terminal 1301 of transformer T–1301. This alternating voltage is transformed and appears as a lower or higher voltage at points 1307 and 1308, depending on the turns ratio of T–1301 and the values of resistors R–1301 and R–1302. The voltage between points 1307 and 1308 causes a current flow through resistors R–1301 and R1302 to junctions 1309 and 1310. The voltage between junctions 1309 and 1310 further causes currents to flow through resistors R–1303 and R–1304, whereby a voltage is developed between terminals 1311 and 1312. This voltage is then transformed by transformer T–1302 and appears as an output voltage at terminal 1302. Diodes D–1301 through D–1304 are connected in a first bridge circuit B–1301 as shown in FIG. 13, and diodes D–1305 through D–1308 are connected in a similar bridge circuit B–1302. If a direct voltage is applied between points 1303 and 1304 all four of the diodes of bridge B–1301 may be biased to cutoff, with negative voltage applied to control terminal 1304 and positive voltage applied to control terminal 1303. In this condition, there is no current flow through any of the diodes. If a negative voltage is applied similarly at point 1306 and positive voltage to point 1305, bridge B–1302 may be similarly biased to cutoff. With the bridges biased to such a condition, the maximum output voltage will appear at terminal 1302. If now, however, either of the diode bridges are biased in the forward direction, such as, for example, by application of positive voltage to terminal 1304 and negative voltage to terminal 1303, all four diodes of bridge B–1301 will conduct and will present an impedance between terminals 1309 and 1310 which varies in proportion to the current flowing through the diode bridge. Due to the fact that four diodes are employed, the diodes on one side of each bridge are in opposition to the alternating A.C. signal between terminals 1309, 1310 at any instant. For example, diode D–1301 is connected oppositely to diode D–1304 and diode D–1302 is connected in opposite direction to diode D–1303 as far as the alternating signal is concerned. The two diodes which are biased to conduct during any given half-cycle of the alternating signal will present a continually lowering impedance as increased current flows through terminals 1303 and 1304, thereby reducing the alternating voltage by acting as a voltage divider with R–1301 and R–1302. Therefore, the voltage between terminals 1309 and 1310 will be reduced. If the above mentioned current is caused to flow through terminal 1305 and 1306, a further reduction of voltage will take place at points 1311 and 1312. As many bridge circuits as necessary may be provided in order to provide the overall voltage reduction or attenuation desired. Ratios of 10,000 to one may be accomplished before noise will undesirably limit the usefulness of the circuit. Thus it will be seen that the circuit acts as a direct current controlled variable attenuator for alternating signals. It is important that the impedance level of secondary winding L–1301 of transformer T–1301 and the primary winding L–1302 of transformer T–1302 have sufficiently low impedance that the voltages applied across the diode bridges will be sufficiently low to minimize distortion through the network Each attenuator may utilize only two diodes. For example, in bridge B–1302, diodes D–1306 and D–1307 could be omitted. If omitted, a D.C. return path for the control current must be provided. Such a path may be provided either by use of a pair of resistors in place of the omitted diodes, by use of a center-tap as shown at 1313 on primary winding L–1302 of transformer T–1302, by use of individual inductors in place of the omitted diodes, or by use of a single center-tapped inductor in place of the two omitted diodes.

Figure 15:
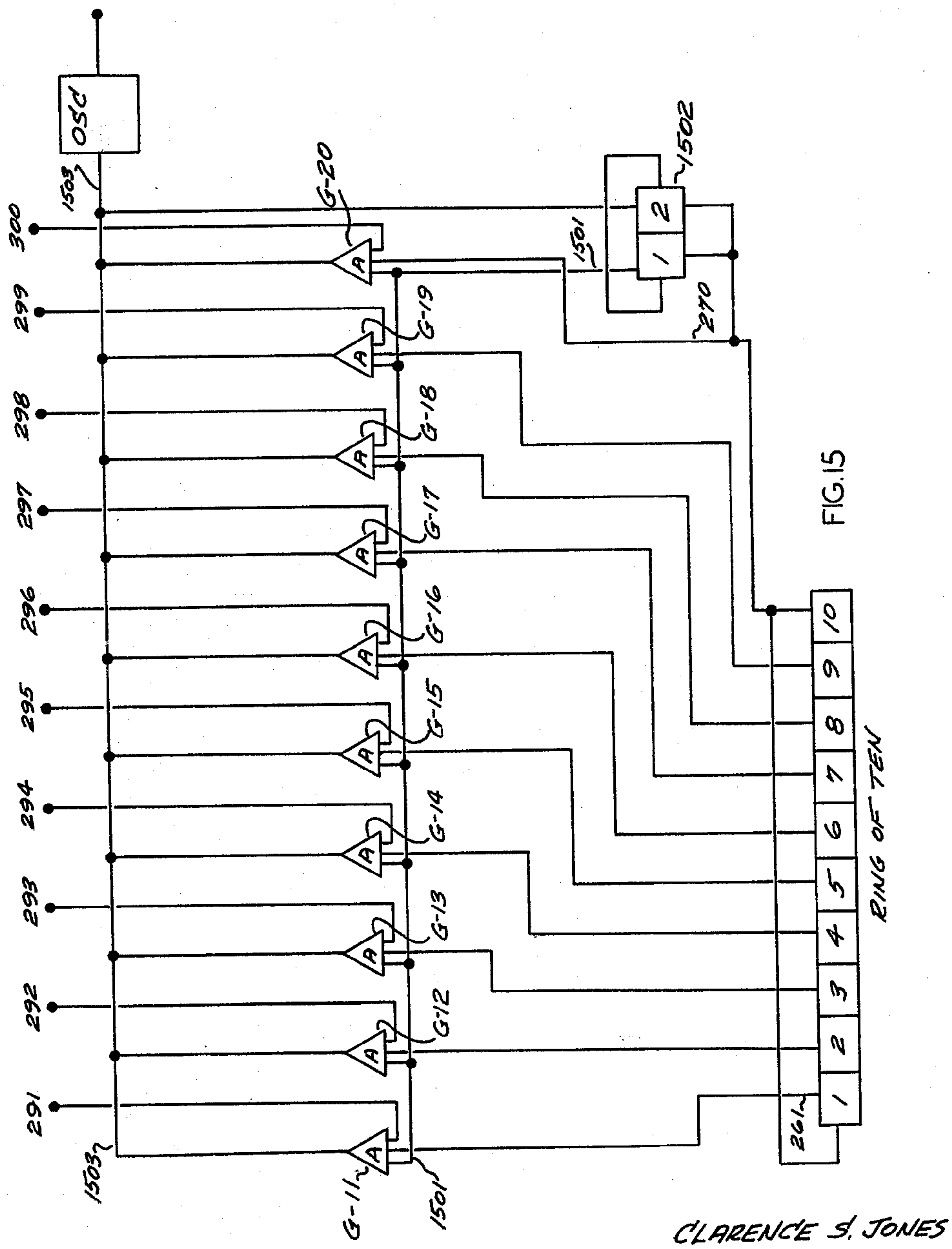
FIG. 15 is a block diagram illustrating one arrangement which may be used to provide serial digital signals to transmit data registered in the register portion of the invention.

FIG. 15 illustrates one method by which the information in the register portion of the invention may be utilized to operate a radio transmitter or other remote communications apparatus. It will be recalled that each response block is identified by the binary number appearing in the register when the interrogator passes by the block, the voltages on conductors 291 through 300 (FIG. 7) indicating the binary number. These voltages are applied individually as shown in FIG. 15 to ten "and" circuits G–11 through G–20, each of which may comprise a triple coincidence "and" circuit of conventional design. As well as the voltage from its associated stage or order of register 244, each of the ten "and" circuits receives a voltage from the corresponding order or stage of "ring-of-ten" counter 227, and a third input voltage from conductor 1501, one output terminal of a conventional bistable flip-flop 1502. Flip-flop 1502 may utilize the circuit of FIG. 10 if desired. One output conductor 270 of ring 227 may be connected to apply a pulse to flip-flop 1502 during each cycling of the counter through all ten of the digit positions. Thus flip-flop output conductor 1501 will be "low" for 10 cycles of flip-flop 202 (FIG. 2) or 20 cycles of the 400 cycle timing signal and then "high" for a similar period, etc. During the cycles when conductor 1501 is high, output voltages will be applied successively via conductors 216 through 270 to "and" circuits G–11 through G–20, and each of those "and" circuits which simultaneously receives a "high" voltage from register 244 will provide an output pulse on conductor 1503. The output voltage on conductor 1503 may be applied to key any conventional modulator to modulate a conventional transmitter. The output voltage on conductor 1503, which consists of serial pulses, also may be applied to actuate numerous data processing devices and indicators.

Figures 14, 16:
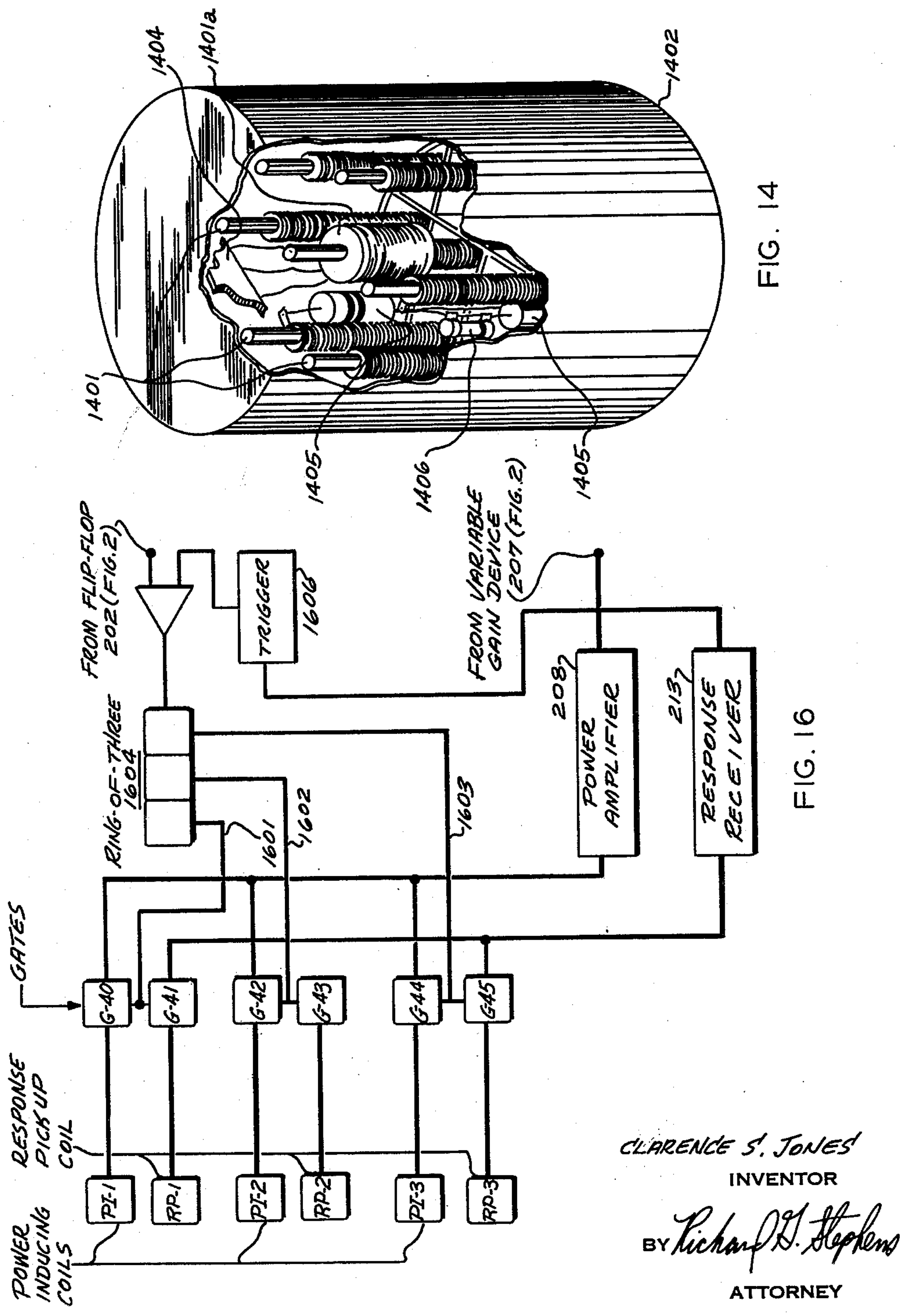
FIG. 14 is a perspective view, with certain portions cut away, of an exemplary physical arrangement for the "response block" portion of the invention.
FIG. 16 is a block diagram illustrating an arrangement which may be used to collect data from a plurality of locations with a single interrogation unit.

FIG. 14 illustrates an exemplary embodiment of response block such as may be used for railway use. The response block may comprise a cylindrical plastic (or other non-magnetic non-conductive) housing 1402 in which the various elements are potted, preferably by use of a weatherproof epoxy resin compound having low radio frequency less characteristics. Use of a cylindrical block facilitates installation where the blocks are to be mounted along the track at fixed locations, since circular holes may be bored in the ties more easily than other shapes. Each response block may be sunk completely within a hole drilled in a tie and completely hidden from view. Such installations may be made completely weatherproof and vandal-proof. Obviously the block may be mounted at other locations along a railroad right-of-way, either exposed or hidden. Hooks, snaps and other fasteners (not shown) preferably of non-metallic construction, may be used.

Illustrated in FIG. 14 are a plurality of cores 1401, 1401, shown as comprising cylindrical ferrite rods, around which are wound the coils of the various tuned circuits, the oscillator tank circuit, and the power amplifier tuned circuit of such a stage is provided. If a power amplifier stage is provided, the magnetic circuit of the oscillator should be isolated from the amplifier magnetic circuit as mentioned above, and such isolation may be accomplished effectively either by shielding the oscillator coil or preferably by providing a closed magnetic path for the oscillator. The latter may be effectively accomplished by use of a torus-shaped ferrite core (not shown) in the oscillator circuit. The response block also contains capacitors such as shown at 1405, one or more diodes such as shown at 1406 and one or more semi-conductors such as the transistor shown at 1404, all connected together according to one of the circuits of FIG. 1, for example. A convenient arrangement of the tuned circuits and oscillator tank circuit is that shown in FIG. 14, wherein the oscillator core 1401*a* is centered on the axis of the cylindrical block, with tuned circuit cores 1401 spaced around in circular array, so that equilateral triangles are defined by the axes of each adjacent pair of tuned circuit cores and the oscillator tank circuit core. In certain embodiments of the invention it may be desirable to alter the ferrite core shapes according to known principles to make either the tuned circuit magnetic paths, the oscillator tank circuit path, or a power amplifier tuned circuit path more or less directional in nature. Furthermore, while the simplicity and low cost of the illustrated response blocks usually makes it unnecessary for most applications, it is within the scope of my invention to provide adjustable or switchable response blocks, so that the resonant frequencies of the tuned circuits and other circuits of the response blocks may be changed. Various ways to adjust, vary or switch the circuits manually or automatically in response to a condition will be obvious without further explanation.

As mentioned above, the present invention may be utilized for passing information as to the identity or other condition of a plurality of movable devices to a given location. For example, response blocks of the nature described above may be attached to railroad cars as they enter a yard, and an interrogator unit may be provided to determine the identity of each car as it passes a given point in the switch yard by locating the interrogator power-inducing and response pickup coils at the given point. It will be apparent that any desired number of interrogator units may be provided to identify cars passing by desired check points. Identification data in the interrogator unit may be transmitted to any desired remote point by usual means, used to operate track switches to sort the cars, and for numerous other purposes. It should be recognized that in any embodiment of the invention that the interrogator power-inducing and response pickup coils may be physically located at considerable distances from the other portions of the interrogator unit by provision of suitable electrical connections.

Trucks, motor busses, and other vehicles may be provided with response blocks attached to their undercarriages in order to gather and store information relating to vehicle movements. In certain embodiments of the invention, it will be desirable to provide power-inducing and response pickup coils having large physical dimensions in order to allow increased variation in the paths of the movable objects. For example, such coils may be made large enough to extend across a highway or an airfield landing strip, and buried in concrete.

The invention also may be used to identify objects transported on conveyors and other materials handling devices. For example, a response block coded in accordance with desired destination and perhaps in accordance with class may be inserted in or attached to each mail bag transported along a conveyor, chute, or other path, and interrogator may be used to identify each bag of mail and to provide indications or control signals suitable for automatically controlling the mail-handling operation. Response blocks may be attached to parts moving along assembly lines to identify the parts and to provide data for actuating automatic handling and assembly apparatus. The invention also may be used to identify buried objects if response blocks are appropriately associated with respect to the buried objects. Various other uses will be apparent in light of the above disclosure.

While FIG. 2 shows an embodiment in which a single interrogator power-inducing coil and single response pickup coil are utilized with the remainder of the interrogator, it is entirely within the scope of my invention to multiplex different locations in order to collect data from a plurality of locations at minimum cost, and exemplary suitable apparatus of this nature is shown in block form in FIG. 16. Identification data may be collected from three different locations by means of apparatus constructed in accordance with FIG. 16, and it will become obvious that any desired number of locations may be "read" by straight-forward expansion of the principles illustrated by the apparatus disclosed. A power-inducing coil and a response pickup coil are provided at each location, or, as mentioned above, the two coils may be combined into a single coil, if desired and if suitable filtering is provided. Power-inducing coil PI–1 and response pickup coil RP–1 are located together at first location from which data is to be collected, and the other four coils may be grouped similarly at two other locations. Power-inducing coils PI–1, PI–2 and PI–3 are connected individually through gates G–40, G–42 and G–44 to the output circuit of power amplifier 208, so that control signals applied to the gates may be used to route the power amplifier output signal individually to each of the three locations. Response pickup coils RP–1, RP–2 and RP–3 are connected individually through gates G–41, G–43 and G–45 to the input circuit of response receiver 213, so that control signals applied to those gates may be used to route the response signal picked up at any one of the three locations to response receiver 213. Since each response pickup coil should be connected when its associated power-inducing coil is transmitting, it will be seen that the two gates associated with a given location may be controlled from the same source.

The six gates which connect the coils in FIG. 16 may be controlled as shown by a "ring-of-three" shown at 1604, so that output signals from the ring on lines 1601, 1602 and 1603 serve to connect the coils sequentially to the power amplifier and response receiver. "Ring of three" is shown connected to be driven by "not and" circuit 1605 each pulse applied to the ring serving to advance it one position. "Not and" circuit 1605 may be driven from the interrogator timing circuit, such as by connecting an output terminal of flip-flop 202 (FIG. 2) to terminal 1610, thereby advancing the ring to a different position 200 times per second. The arrangement described will serve to connect coils PI–1 and RP–1 for an automatic gain control interval and a code transmission interval, then to connect coils PI–2 and RP–2 for a similar period, then to connect coils PI–3 and RP–3 for a similar interval, and then to repeat. The presence of sequencing pulses from flip-flop 202 result in the application of similar pulses to ring 1604 only in the absence of an inhibiting signal applied to "not and" circuit 1605 from trigger circuit 1606 via line 1611.

As shown in FIG. 16, a signal may be derived from the output circuit of response receiver 213 to provide an inhibit signal when the magnitude of the receiver output indicates that response signals are being received. The inhibit signal is shown in FIG. 16 as being derived and applied via trigger 1606, which may comprise an ordinary Schmidt trigger. Rather than from the direct output of receiver 213, the inhibit signal may be supplied from the output of filter 214, 224, or from the output signals of differential amplifiers 215 or 225. Assume that the arrangement illustrated in FIG. 16 is applied to a railroad switchyard having three tracks which converge to a single track, and that the three coil locations for FIG. 16 are points on the three tracks adjacent to a junction at which the three tracks join to form the single track. It will be known that only one car can leave the single track to go on one of the three tracks at a given instant, and further, that only one car can leave one of the three tracks to enter onto the single track at a given instant. The circuit of FIG. 16 may be used to scan or search the three tracks, and then to stop and concentrate when a car appears, on whichever of the three tracks upon which the car is leaving or entering. The inhibit pulse on line 1611 serves to stop the cycling of ring 1604 when a response signal appears, thereby causing the system to maintain coil connections to whichever track the car is on, as long as the car supplies an answer signal sufficiently strong to operate trigger 1606.

While FIGS. 4 through 13 disclose a number of improved circuits which utilize PNPN semiconductors and novel circuits, equivalent vacuum-tube circuits and other semiconductor circuits are known and may be substituted without departing from the invention. For sake of clarity and to avoid obscuring the gist of the invention with a recital of known techniques, polarity inverters, amplifiers, buffer devices, and standard pulse-shaping and delay circuits which may be used in certain embodiments of the invention have been omitted, since those skilled in the art will have no trouble inserting such devices where necessary or desirable.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the inventions which, as a matter of language, might be said to fall therebetween.

Having described my invention, what I claim as new and desire to secure by Letters Patent is:

1. A passive responder device comprising in combination, a plurality of tuned electrical circuits each resonant at a different frequency, each of said circuits being connected to provide an output voltage upon receipt of an electromagnetic signal corresponding to its individual resonance frequency, and means connected to said output voltages to provide an electromagnetic response signal at a further frequency upon occurrence of any one of said output voltages.

2. Apparatus according to claim 1 in which each of said tuned circuits is connected to provide operating power to the last of said means, and in which the last of said means comprises an electrical oscillator means.

3. Apparatus according to claim 1 in which at least one of said tuned circuits comprises a parallel-resonant inductance-capacitance network.

4. Apparatus according to claim 1 in which a plurality of said tuned circuits comprise parallel-resonant inductance-capacitance networks, in which each of said networks is connected to a pair of conductors through rectifier means, and in which said means for providing said response signal comprises an oscillator system connected to said conductors to receive its operating power.

5. A passive responder device comprising in combination, a plurality of tuned electrical circuits each resonant at a different frequency, each of said circuits being connected to provide an output voltage upon receipt of an electromagnetic signal corresponding to its individual resonance frequency, and each of said tuned-circuits comprising an inductance-capacitance network, each of said networks being connected to apply its output voltage through rectifier means to a pair of conductors to provide electrical power at said conductors, and oscillator means tuned to provide an electromagnetic signal at a further frequency connected to said conductors to be powered by presence of electrical power at said conductors.

6. Apparatus according to claim 5 in which a plurality of said tuned circuits are connected in series with each other between said pair of conductors.

7. Apparatus according to claim 5 in which a plurality of said tuned circuits are connected in parallel with each other and between said pair of conductors.

8. Apparatus according to claim 5 in which a first group of said plurality of tuned circuits are connected in series with each other, a second group of said plurality of tuned circuits are connected in series with each other, and said first and second groups are connected in parallel between said pair of conductors.

9. Apparatus according to claim 6 in which said rectifier means comprises a diode connected in series with said tuned circuits between said pair of conductors.

10. Apparatus according to claim 7 in which said rectifier means comprises a plurality of diodes, each of said diodes being connected in series with one of said tuned circuits between said pair of conductors.

11. Apparatus according to claim 8 in which said rectifier means comprises a plurality of diodes, each of said diodes being connected in series with one group of said groups of tuned circuits.

12. A responder device comprising in combination, a plurality of tuned electrical circuits each resonant at a different frequency, each of said circuits being connected to provide an output voltage on a pair of conductors upon receipt of an electromagnetic interrogation signal corresponding to its individual resonance frequency, means connected to said pair of conductors to provide an electromagnetic response signal at a further frequency upon application of any one of said output voltages to said conductors, and an amplifier stage connected to be powered from said conductors and connected to amplify said response signal.

13. Apparatus according to claim 12 in which each of said circuits is connected to said pair of conductors through rectifier means, thereby providing direct voltage between said pair of conductors.

14. A passive responder device comprising in combination, a plurality of tuned circuits each resonant at a different frequency, each of said circuits being connected to provide an output voltage upon receipt of an applied electromagnetic interrogation signal corresponding to its individual resonance frequency, an oscillator operable upon application of a supply voltage to provide an electromagnetic response signal at a further frequency, circuit means connecting the output voltage from a first of said tuned circuits to provide said supply voltage for said oscillator, an amplifier connected to amplify said response signal upon application of a control voltage, and further circuit means connecting said output voltage from a further of said tuned circuits to provide said control voltage for said amplifier.

15. Apparatus according to claim 14 in which said circuit means includes rectifier means connected to said output voltage of said first of said tuned circuits to provide a direct supply voltage.

16. Apparatus according to claim 14 in which said further circuit means includes rectifier means connected to said output voltages of said further of said tuned circuits to provide a direct control voltage.

17. Interrogator-responder apparatus comprising in combination, interrogator means for transmitting a plurality of electromagnetic interrogation signals of different frequencies, and a passive responder operable to provide an electromagnetic response signal on a further frequency upon receipt of selected ones of said different frequencies; said responder comprising a plurality of tuned circuits each resonant at a different frequency, each of said circuits being connected to provide an output voltage upon receipt of a signal from said interrogator which corresponds in frequency to its individual resonance frequency, each of said circuits being connected to apply its output voltage to a pair of supply conductors, and response oscillator means connected to said conductors to be powered by said output voltages and thereby to provide said response signal.

18. Apparatus according to claim 17 in which said interrogator means includes a plurality of interrogator oscillators each operable to provide a different frequency signal, cycling means for gating said interrogator oscillators to provide a series of signals of different frequencies, and a receiver circuit responsive to said response signals from said responder.

19. Apparatus according to claim 18 having amplifier means for varying the amplitude of said signals of different frequencies from said interrogator oscillators, means for providing a reference amplitude signal, and means connected to said receiver circuit and said reference amplitude signal for comparing the amplitude of the response signal received by said receiver with the amplitude of said reference signal to provide a control signal commensurate with their difference in amplitude, said control signal being connected to control said amplifier means.

20. Interrogator-responder apparatus comprising in combination, interrogator means for transmitting a plurality of electromagnetic interrogation signals of different differing frequencies, a passive responder including a plurality of tuned receiving elements, said responder being operable to provide an electromagnetic response signal of a further frequency upon receipt of selected ones of said plurality of interrogator signals, a receiver for said response signal, means for comparing the magnitude of the received response signal with magnitude of a reference signal to provide a difference signal, and means responsive to said difference signal for controlling the amplitudes of said plurality of interrogation signals.

21. Interrogator-responder apparatus comprising in combination, interrogator means for transmitting a plurality of electromagnetic radiations having different frequencies, a passive responder including a plurality of frequency-sensitive elements and, operable to provide an electromagnetic response signal on a further frequency upon recepit of selected ones of said different radiations, said interrogator means and said responder being capable of relative movement so as to vary the length and attenuation of the path of electromagnetic radiation between said interrogator means and said responder, a receiver associated with said interrogator means and operative to receive said response signals from said responder, means for comparing the magnitude of a particular response signal received by said receiver with a reference magnitude to provide a difference signal, and means responsive to said difference signal for controlling the amplitude of each of said plurality of electromagnetic radiations.

22. A passive responder device comprising in combination, a plurality of tuned electrical circuits each resonant at a different frequency, each of said circuits being connected to provide an output voltage upon recepit of an applied electromagnetic interrogation signal corresponding to its individual resonance frequency, an oscillator operable upon application of a control voltage to provide an electromagnetic response signal at a further frequency, an amplifier connected to amplify said response signal upon application of a supply voltage, circuit means connecting the output voltage from a first of said tuned circuits to provide said supply voltage for said amplifier and further circuit means connecting said output voltages from further of said tuned circuits to provide said control voltage for said oscillator.

23. Apparatus according to claim 22 in which said circuit means includes rectifier means connected to said output voltage of said first of said tuned circuits to provide a direct supply voltage.

24. Apparatus according to claim 22 in which said further circuit means includes rectifier means connected to said output voltages of said further of said tuned circuits to provide a direct control voltage.

25. Interrogator apparatus for transmitting a plurality of electromagnetic interrogation signals to one or more passive remote responders powered by said signals and for receiving electromagnetic response signals from said responders, comprising in combination, means for providing and transmitting a plurality of different frequency interrogation signals, receiver means for receiving said response signals, a variable gain device operable to control the strength of the transmitted different frequency interrogation signals, comparison means connected to receive certain of said response signals from said receiver and operable to provide a control voltage commensurate with the strength of said certain of said response signals, said control voltage being connected to said variable gain device to control the strength of said transmitted different frequency interrogation signals.

26. Apparatus according to claim 25 in which said means for providing and transmitting said plurality of different frequency signals comprises a plurality of separate fixed frequency oscillators, and cycling means for causing said oscillators successively to apply said different frequency signals to a common radiating element.

27. Apparauts according to claim 25 which includes a gate connected between said receiver means and said comparison means, and timing means connected to operate said gate, whereby certain response signals received by said receiver means are passed to said comparison means, while certain other of the response signals received by said receiver means are not passed to said comparison means.

28. Apparatus according to claim 25 which includes a register connected through circuit means to be actuated in response to other of said response signals received by said receiver means, said circuit means including switching means responsive to said control voltage and operable to pass said other of said response signals to or to exclude said other of said response signals from said register in accordance with the strength of said certain of said response signals.

29. Apparatus according to claim 25 in which said means for providing and transmitting said plurality of different frequency signals comprises first oscillator means for providing a first frequency signal, second oscillator means for providing further signals of different frequencies, a power amplifier, timing means operable to apply said first frequency signal and individual of said further signals alternately to said power amplifier, and cycling means controlled by said timing means for controlling said second oscillator means.

30. Apparatus according to claim 25 having gating means connected to the output circuit of said receiver, a register connected through circuit means to the output circuit of said receiver, and timing means connected to switch said gating means, whereby certain of said response signals are passed to said comparison means and others of said response signals are passed to said register through said circuit means.

31. Apparatus according to claim 25 in which said means for providing and transmitting a plurality of different frequency signals comprises a plurality of separate fixed frequency code oscillators, cycling means for causing said code oscillators successively to apply said different frequency signals to an output circuit, a further oscillator for providing a further different frequency signal to said output circuit, and timing means including a bi-polar switching device for alternately actuating said cycling means and said further oscillator.

32. Interrogator and receiver apparatus for transmitting a plurality of electromagnetic interrogation signals to one or more passive remote responders powered by said interrogation signals and for receiving and registering electromagnetic response signals from said responders, comprising in combination, oscillator means capable of providing a plurality of different frequency interrogation signals, cycling means connected to control said oscillator means to provide successive interrogation signals of different frequencies, receiver means including demodulator means responsive to said response signals and operative to provide a control signal, a register provided with a plurality of stages, an individual stage being provided for each of said different interrogation frequencies, and switching means controlled by said cycling means so as to apply the control signal at any instant to the stage of said register corresponding to the interrogation frequency being transmitted during said instant.

33. Apparatus according to claim 32 in which said switching means comprises a plurality of coincidence circuits.

34. Apparatus according to claim 32 in which said oscillator means comprises a plurality of separate fixed frequency oscillators, said cycling means comprises an electronic ring counter and a timing means connected to advance said counter, said counter having a plurality of output terminals connected individually to key said oscillators.

35. Apparatus according to claim 32 in which said circuit means includes pulse timing means for prolonging application of said control signal to said switching means.

36. Apparatus according to claim 32 having circuit means for deriving a switching signal determined in accordance with response receiver output signal strength, in which said circuit means includes second switching means, said second switching means being controlled by said switching signal to prevent actuation of said register during conditions of insufficient response signal strength.

37. Apparatus according to claim 35 in which said pulse timing means comprises a re-settable trigger circuit.

38. Apparatus according to claim 37 in which said means for deriving the switching signal includes a trigger circuit and provides a bi-valued switching signal, and in which said second switching means comprises an "and" circuit.

39. Apparatus according to claim 37 in which said register is provided with resetting means for clearing data from said register and in which said resetting means is connected to be operated by said switching signal, said register being reset upon initial application of said switching signal to said resetting means.

40. Interrogator apparatus for transmitting a plurality of electromagnetic interrogation signals to one or more passive responders powered by various of said interrogation signals and for receiving electromagnetic response signals from said responders, comprising in combination, oscillator means for providing a plurality of different frequency interrogation signals, power gating means for connecting said interrogation signals selectively to each output coil of a radiating system having a plurality of output coils, a receiver tuned to be sensitive to said response signals, a response signal pickup system having a plurality of pickup coils, signal gating means for connecting said response signals from said response signal pickup system to said receiver, each output coil of said radiating system being located separately from the other output coils and each pickup coil being located separately from the other pickup coils, each output coil being located together with an associated individual pickup coil, timing means for controlling said oscillator means, and cyclic switching means responsive to said timing means for controlling said power gating means and said signal gating means, whereby each pickup coil is connected to said receiver at times during which interrogation signals are being applied to its associated pickup coil.

41. Apparatus according to claim 40 having means connected to said receiver to provide an inhibiting signal upon application of a response signal to said receiver from one of said pickup coils, and circuit means responsive to said inhibiting signal for stopping said cyclic switching means.

42. Interrogator apparatus for transmitting a plurality of electromagnetic interrogation signals to one or more passive responders capable of being powered by said signals, and for receiving electromagnetic response signals from said responders, comprising in combination, means for providing a plurality of electromagnetic interrogation signals having different frequencies, a variable gain device operable to control the strength of said interrogation signals, receiver means for receiving said response signals and operable over a given range to provide an output signal commensurage with the strength of said response signals, said receiver means including at least one variable gain stage and circuit means connecting said output signal to control the gain of said variable gain receiver stage, comparison means connected to receive certain of said response signals from said receiver and operable to provide a control voltage commensurate over a second range with the output signal from said receiver means, said control voltage being connected to said variable gain device to control the strength of said interrogation signals.

43. A railway signalling system, comprising in combination, a plurality of passive responders located along a railway track at separate desired locations, each of said responders having a group of tuned electrical circuits resonant at different ones of a plurality of different electromagnetic interrogation frequencies and oscillator means connected to be powered from said group of tuned circuits to provide electromagnetic response signals on a further frequency; and an interrogator unit carried on a railway vehicle movable along said track, said interrogator unit comprising means for transmitting said plurality of interrogation frequencies, and means for receiving said response signals.

44. A passive responder device comprising in combination, a plurality of tuned circuits each resonant at a different frequency, each of said circuits being connected to supply electrical power to a load upon receipt of an electromagnetic interrogation signal corresponding to its individual resonance frequency, said load comprising means capable upon receipt of said electrical power to provide electromagnetic response signals differing in frequency from the resonant frequencies of said tuned circuits.

45. Apparatus according to claim 44 in which at least one of said plurality of tuned circuits comprises a parallel-resonant inductance capacitance tuned circuit connected to said load through rectifier means.

46. Apparatus according to claim 44 in which at least one of said plurality of tuned circuits comprises a series-resonant inductance-capacitance tuned circuit connected to said load through rectifier means.

47. Apparatus according to claim 44 in which said load comprises a semiconductor oscillator.

48. Apparatus according to claim 44 in which each of said tuned circuits is connected through rectifier means to a pair of conductors to provide direct voltage between said conductors, said load being connected between said conductors and comprising a semiconductor oscillator circuit.

49. Interrogator apparatus comprising in combination a plurality of separate oscillators each provided with an output inductor coil, timing means for providing switching signals, cycling means operated by said switching signals and operable to key said oscillators successively, and a common output coil, said output inductor coils being connected in series to apply signals successively from said oscillators to said common output coil.

50. A railway signalling system, comprising in combination, an interrogator unit having signal coils mounted at a fixed location along a railway track, means for transmitting a plurality of electromagnetic interrogation signals on different frequencies and means for receiving electromagnetic response signals of a further frequency; and a plurality of passive responders carried on railway vehicles movable along said track, each of said responders having a group of tuned circuits resonant at different ones of said plurality of interrogation frequencies and oscillator means connected to be powered from said group of tuned circuits to provide said response signals.

51. An electrical signalling system comprising at least one interrogator equipment and a plurality of passive responders each relatively movable with respect to said interrogator equipment, said interrogator equipment transmitting an interrogation signal which provides operating power for and causes a response signal having a frequency different from the frequency of said interrogation signal from a responder whenever said responder and said interrogator equipments move into close proximity to one another, and wherein different responders have different electrical characteristics, the same interrogator signal giving rise to different response signals from the different responders, whereby close proximity of said interrogator equipment to a responder provides a unique response signal which may be decoded to identify the particular responder being interrogated.

References Cited in the file of this patent

UNITED STATES PATENTS

| | | |
|---|---|---|
| 1,559,992 | Schaffer | Nov. 3, 1925 |
| 2,132,599 | Baumann | Oct. 11, 1938 |
| 2,438,987 | Bailey | Apr. 6, 1948 |
| 2,453,970 | Charrier | Nov. 16, 1948 |
| 2,501,109 | Wallace | Mar. 21, 1950 |
| 2,532,455 | MacSorley | Dec. 5, 1950 |
| 2,636,113 | Doloraine | Apr. 21, 1953 |
| 2,693,525 | Kendall et al. | Nov. 2, 1954 |
| 2,710,341 | Winkler | June 7, 1955 |
| 2,731,553 | Zaffarano et al. | Jan. 17, 1956 |
| 2,735,940 | Norby | Feb. 21, 1956 |
| 2,781,509 | Marshall | Feb. 12, 1957 |
| 2,790,165 | Lien | Apr. 23, 1957 |
| 2,794,117 | Rees et al. | May 28, 1957 |
| 2,933,726 | Campbell | Apr. 19, 1960 |